US012586284B2

(12) United States Patent
Lin

(10) Patent No.: US 12,586,284 B2
(45) Date of Patent: Mar. 24, 2026

(54) METHODS AND SYSTEMS FOR MANIPULATING AND TRANSFERRING COMPUTER-SIMULATED HAIR

(71) Applicant: Gene Wei-Chin Lin, Vancouver (CA)

(72) Inventor: Gene Wei-Chin Lin, Vancouver (CA)

(73) Assignee: Digital Domain Virtual Human (US), Inc.

( * ) Notice: Subject to any disclaimer, the term of this patent is extended or adjusted under 35 U.S.C. 154(b) by 217 days.

(21) Appl. No.: 18/466,705

(22) Filed: Sep. 13, 2023

(65) Prior Publication Data

US 2024/0005584 A1     Jan. 4, 2024

Related U.S. Application Data

(63) Continuation of application No. PCT/CA2022/050359, filed on Mar. 10, 2022.

(60) Provisional application No. 63/163,025, filed on Mar. 18, 2021.

(51) Int. Cl.
| | |
|---|---|
| *G06T 13/40* | (2011.01) |
| *G06T 17/20* | (2006.01) |

(52) U.S. Cl.
CPC .............. *G06T 13/40* (2013.01); *G06T 17/20* (2013.01)

(58) Field of Classification Search
CPC ....... G06T 13/40; G06T 19/003; G06T 19/20; G06T 17/20
USPC ........................................................ 345/418
See application file for complete search history.

(56) References Cited

U.S. PATENT DOCUMENTS

| | | | | |
|---|---|---|---|---|
| 8,743,124 | B2 | 6/2014 | Audoly et al. | |
| 10,699,463 | B2 | 6/2020 | Jiao et al. | |
| 11,074,751 | B2 * | 7/2021 | Li ........................... | G06T 19/20 |
| 12,039,670 | B2 * | 7/2024 | Gomer ................... | G06T 19/00 |
| 2008/0297519 | A1 | 12/2008 | Scapel et al. | |
| 2014/0267225 | A1 * | 9/2014 | Zhang ..................... | G06T 7/564 345/419 |
| 2015/0221119 | A1 * | 8/2015 | Gornowicz ............... | G06T 7/20 345/474 |

(Continued)

OTHER PUBLICATIONS

Jung S, Lee SH. Hair modeling and simulation by style. InComputer Graphics Forum May 2018 (vol. 37, No. 2, pp. 355-363).*

(Continued)

*Primary Examiner* — Phu K Nguyen

(74) *Attorney, Agent, or Firm* — Todd A. Rattray, Oyen Wiggs Green & Mutala LLP

(57) ABSTRACT

A method for manipulating vertex positions of one or more simulated hair strands based on user input while preserving shape details of the one or more simulated hair strands. The method comprises receiving a displacement vector and a region as input and identifying first consecutive groups of vertices of a first simulated hair strand within the region. For each first consecutive group of vertices within the region, the method comprises finding the average vertex position, determining the closest vertex of the consecutive group of vertices to the average vertex position, determining a new positional constraint based on the closest vertex and the displacement vector and determining new vertex positions for the first simulated hair strand by running a constraint enforcement process constrained by the new positional constraint for each consecutive group of vertices and one or more shape-preserving constraints.

18 Claims, 10 Drawing Sheets

(56) References Cited

U.S. PATENT DOCUMENTS

| | | | |
|---|---|---|---|
| 2016/0078675 A1* | 3/2016 | Bowline | G06T 13/40 |
| | | | 345/423 |
| 2016/0154993 A1* | 6/2016 | Aarabi | G06T 7/90 |
| | | | 382/118 |
| 2019/0035133 A1* | 1/2019 | Jiao | G06T 7/251 |
| 2020/0175757 A1* | 6/2020 | Li | G06T 15/00 |
| 2021/0256750 A1* | 8/2021 | Bondich | G06T 11/001 |
| 2022/0004804 A1* | 1/2022 | Gourmel | G06F 18/2323 |
| 2023/0316613 A1* | 10/2023 | Bondich | G06T 11/001 |
| | | | 345/589 |
| 2024/0005584 A1* | 1/2024 | Lin | G06T 17/20 |
| 2024/0394979 A1* | 11/2024 | Yang | G06T 13/40 |

OTHER PUBLICATIONS

Verma S, Raman S. PanoHair: detailed hair strand synthesis on volumetric heads. arXiv preprint arXiv:2508.18944. Aug. 26, 2025.*

Takimoto Y, Takehara H, Sato H, Zhu Z, Zheng B. Dr. hair: Reconstructing scalp-connected hair strands without pre-training via differentiable rendering of line segments. InProceedings of the IEEE/CVF Conference on Computer Vision and Pattern Recognition 2024 (pp. 20601-20611).*

Chai M, Wang L, Weng Y, Yu Y, Guo B, Zhou K. Single-view hair modeling for portrait manipulation. ACM Transactions on Graphics (TOG). Jul. 1, 2012;31(4):1-8.*

Kelly Ward et al.: "A Survey on Hair Modeling: Styling, Simulation, and Rendering", IEEE Transactions on Visualization and Computer Graphics, vol. 13, No. 2, pp. 213-234, Mar./Apr. 2007.

Kaur et al., "Hierarchical controls for art-directed hair at Disney", 2018.

Lin, "Merging Procedural and Non-procedural Hair Grooming", 2018.

Somasundaram, "Dynamically Controlling Hair Interpolation", 2015.

Bowline et al., "Haircraft: Spell and Incantations for Digital Hair", 2016.

Müller et al., "Position Based Dynamics", 2006.

Müller et al., "Meshless Deformations Based on Shape Matching", 2005.

Kugelstadt et al., "Position and Orientation Based Cosserat Rods", 2016.

Peregrine Yeti, "Guide Curves" published online (support.peregrinelabs.com), Mar. 9, 2021.

Peregrine Yeti, "Grooming" published online (support.peregrinelabs.com), Jan. 18, 2023.

Butts et al., "Engineering full-fidelity hair for Incredibles 2", 2018.

Andrus et al., "Furtility: robust hair styling", 2015.

Barbershop at Weta "Sci-tech winner explained", 2015.

* cited by examiner

METHODS AND SYSTEMS FOR MANIPULATING AND TRANSFERRING COMPUTER-SIMULATED HAIR

REFERENCE TO RELATED APPLICATIONS

This application is a continuation of Patent Cooperation Treaty (PCT) application No. PCT/CA2022/050359 having an international filing date of 10 Mar. 2022 which in turn claims priority from, and for the purposes of the United States the benefit under 35 USC 119 in relation to, U.S. application No. 63/163,025 filed 18 Mar. 2021. All of the applications referred to in this paragraph are hereby incorporated herein by reference.

TECHNICAL FIELD

This application relates to computer-based graphical simulation and/or animation. Particular embodiments provide methods and systems for computer-based graphical simulation and/or animation involving manipulation of one or more hair strands of a character.

BACKGROUND

In traditional animation, animators begin by drawing sequences on sheets of transparent paper one frame at a time. The frames are then stitched together to create moving images. To achieve realistic animation of characters (e.g. life-like human characters, animal characters, humanoid characters, invented characters, etc.) requires talented artists and a significant amount of time and resources.

Computer-based graphical simulation (also known as computer-based digital animation which may be referred to herein simply as "simulation") seeks to reduce the time and resources required by traditional animation. For computer-based digital animation, each individual strand of hair of a character (e.g. a computer generated character) may be represented by a plurality of interconnected vertices extending from a surface (sometimes referred to, and/or represented in the computer as, a "mesh") of the character. Adjacent vertices may be connected by segments or rods. By changing the relative location of the vertices and/or the orientation of the segments, different hair styles can be achieved. Since a character may have thousands of simulated hair strands and each simulated hair strand may comprise hundreds of vertices/segments, it can be very time consuming to arrange the simulated hair strands into a desired hair style.

There is a desire for tools and methods which facilitate arranging of simulated hair strands into desired hair styles.

Individual simulated hair strands may have inherent characteristics. Such inherent characteristics may include inherent shape characteristics. For example, individual hair strands may be wavy, straight, curly, etc. In real life, when hair is styled, individual hair strands tend to maintain their inherent shape characteristics (unless one purposefully changes such shape characteristics by, for example, straightening or curling). For example, despite sweeping back wavy hairs with a hand or a comb, the hair strands remain wavy. Similarly, despite pushing curly hairs behind an ear, the hair strands remain curly. However, when positioning a simulated hair using prior art computer-based digital animation techniques, moving the simulated hair requires an artist's subjective judgment to manually re-create the inherent shape characteristics of the simulated strand after (or while) moving the simulated strand on a vertex-by-vertex basis. Given that a character may have thousands of simulated hair strands and each simulated hair strand may have dozens or hundreds of vertices, it is very time-consuming and labour-intensive to create or change the style of simulated hair while maintaining inherent shape characteristics of individual simulated strands.

There is a desire for tools and methods which facilitate manipulation of simulated hair strands while maintaining inherent shape characteristics of the simulated hair strands.

For some hair styles, individual hair strands tend to group together in groups which may be referred to as "clumps". It may be desirable to re-create such clumping effects when simulating such hair styles. However, when re-positioning a simulated hair with prior art computer-based digital simulation techniques, moving the simulated hair requires an artist's subjective judgment to manually maintain the clumping effect. Given that a character may have thousands of simulated hair strands and each simulated hair strand may have dozens or hundreds of vertices, it is very time-consuming and labour-intensive to create or change the style of simulated hair while maintaining desired clumping effects.

There is a desire for tools and methods which facilitate manipulation of simulated hair strands while maintaining clumping effects.

Given how time-consuming it can be to style hair in computer-based digital animation, it may be desirable to copy a simulated hair style from a first simulated character to one or more other simulated characters. However, since different characters may have differently shaped meshes (e.g. scalps), transferring a simulated hair style from a first character with a first mesh shape to a second character with a second mesh shape using prior art digital animation techniques typically requires time and labour-intensive work by an artist to account for the differences in mesh shape.

There is a desire for tools and methods which facilitate transferring a simulated hair style from a first character with a first mesh shape to a second character with a second mesh shape.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for manipulating vertex positions of one or more simulated hair strands while preserving shape details of the one or more simulated hair strands. The method comprises receiving a displacement vector and a region as input and identifying one or more first consecutive groups of vertices of a first simulated hair strand within the region. For each of the one or more first consecutive group of vertices within the region, the method comprises: finding a representative (e.g. an average) vertex position, determining the closest vertex of the consecutive group of vertices to the representative vertex position, determining a new positional constraint based on the closest vertex and the displacement vector and determining new vertex positions for the first simulated hair strand by executing a constraint enforcement process constrained by one or more constraints, the one or more constraints comprising the new positional constraint for each consecutive group of vertices and one or more shape-preserving constraints.

In some embodiments, receiving the displacement vector and the region comprises receiving manual user input (e.g. via a suitable user input device such as a mouse, motion capture device or touchscreen). In some embodiments, receiving a displacement vector and a region comprises determining the displacement vector and the region based at least in part on a gesture of a user (e.g. via a suitable user input device such as a mouse, motion capture device or touchscreen). In some embodiments, receiving a displacement vector and a region comprises determining the displacement vector and the region based at least in part on movement of a cursor by a user (e.g. via a suitable user input device such as a mouse, motion capture device, or touchscreen).

In some embodiments, identifying the one or more first consecutive groups of vertices of the first simulated hair strand within the region comprises, for each of the one or more first consecutive groups: selecting a first vertex of the first simulated hair strand within the region and identifying the first vertex to be part of the first consecutive group, and identifying one or more additional vertices to be part of the first consecutive group if, for each of the one or more additional vertices, the additional vertex is directly connected by a single segment to a vertex previously identified to be part of the first consecutive group and the additional vertex is within the region.

In some embodiments, the one or more shape-preserving constraints comprise one or more positional constraints. In some embodiments, the one or more shape-preserving constraints comprise one or more rod constraints. In some embodiments, the one or more rod constraints are selected from the group consisting of size constraints, stretch constraints, shear constraints, bending constraints, twisting constraints and orientation constraints.

In some embodiments, the method comprises identifying a clump associated with the first simulated hair strand, determining one or more clump constraints based at least in part on the clump associated with the first simulated hair strand wherein the one or more constraints comprise the one or more clump constraints. In some embodiments, the clump comprises one or more nearby simulated hair strands of the one or more simulated hair strands and identifying the clump associated with the first simulated hair strand comprises identifying the one or more nearby simulated hair strands.

In some embodiments, identifying the one or more nearby simulated hair strands comprises identifying ones of the one or more simulated hair strands as nearby simulated hair strands if, for each one of the one or more simulated hair strands the one of the one or more simulated hair strands intersects a space centered around a tip of the first simulated hair strand or the one of the one or more simulated hair strands intersects a space centered around a tip of a previously identified nearby simulated hair strand.

In some embodiments, the one or more clump constraints comprise a clump constraint corresponding to each of the one or more nearby simulated hair strands and each clump constraint comprises a relationship between the tip of the first simulated hair strand and a corresponding nearby simulated hair strand. In some embodiments, the one or more clump constraints comprise a clump constraint corresponding to each of the one or more nearby simulated hair strands and each clump constraint comprises a distance between the tip of the first simulated hair strand and a nearest segment of a corresponding nearby simulated hair strand.

In some embodiments, determining a new positional constraint based on the closest vertex and the displacement vector comprises adding the displacement vector to the closest vertex to obtain the new positional constraint.

Another aspect of the invention provides a method for transferring at least a plurality of simulated hair strands from a first simulated character to a second simulated character. The method comprises determining a first center of mass of root positions of the plurality of simulated hair strands on the first character, mapping the root positions of the plurality of simulated hair strands from the first character to the second character to obtain transferred root positions of a plurality of transferred simulated hair strands, determining a second center of mass of the transferred root positions of the plurality of transferred simulated hair strands on the second character based on the transferred root positions. For each of the plurality of simulated hair strands, the method comprises determining a rotational matrix based on the first center of mass, the second center of mass, the root positions and the transferred root positions, determining a transferred tip position based on the center of mass, the transferred center of mass, the rotational matrix and a tip position, and determining new vertex positions by running a constraint enforcement process constrained by the transferred root position, the transferred tip position and one or more shape-preserving constraints.

In some embodiments, mapping root positions of the plurality of simulated hair strands from the first character to the second character to obtain the transferred root positions of the plurality of transferred simulated hair strands comprises mapping the root positions of the plurality of simulated hair strands from the first character in a first coordinate system to an intermediate coordinate system and subsequently mapping the plurality of simulated hair strands from the first character in the intermediate coordinate system to the second character in a second coordinate system to obtain the transferred root positions of the plurality of transferred simulated hair strands.

In some embodiments, the intermediate coordinate system is a two-dimensional coordinate system and the first and second coordinate systems are three-dimensional coordinate systems.

In some embodiments, mapping the root positions of the plurality of simulated hair strands from the first character to the second character to obtain the transferred root position of the plurality of transferred simulated hair strands comprises mapping root positions of the plurality of simulated hair strands from a first triangular mesh of the first character to a second triangular mesh of the second character to obtain the transferred root position of the plurality of transferred simulated hair strands.

In some embodiments, the method comprises determining a one-to-one correspondence of triangles of the first triangular mesh to triangles of the second triangular mesh and mapping root positions of the plurality of simulated hair strands from the first triangular mesh of the first character to the second triangular mesh of the second character to obtain the transferred root position of the plurality of transferred simulated hair strands based at least in part on the one-to-one correspondence.

In some embodiments, mapping root positions of the plurality of simulated hair strands from the first triangular mesh of the first character to the second triangular mesh of the second character to obtain the transferred root position of the plurality of transferred simulated hair strands comprises mapping the root positions of the plurality of simulated hair strands in a barycentric coordinate system from the first triangular mesh of the first character to the second triangular mesh of the second character to obtain the transferred root positions of the plurality of transferred simulated hair strands in the barycentric coordinate system.

In some embodiments, mapping the root positions of the plurality of simulated hair strands from the first character to the second character to obtain the transferred root position of the plurality of transferred simulated hair strands comprises mapping the root positions of the plurality of simulated hair strands from a first polygonal mesh of the first character to a second polygonal mesh of the second character to obtain the transferred root position of the plurality of transferred simulated hair strands.

In some embodiments, the method comprises determining a one-to-one correspondence of polygons of the first polygonal mesh to polygons of the second polygonal mesh and mapping the root positions of the plurality of simulated hair strands from the first polygonal mesh of the first character to the second polygonal mesh of the second character to obtain the transferred root position of the plurality of transferred simulated hair strands based at least in part on the one-to-one correspondence.

In some embodiments, mapping the root positions of the plurality of simulated hair strands from the first polygonal mesh of the first character to the second polygonal mesh of the second character to obtain the transferred root position of the plurality of transferred simulated hair strands comprises mapping the root positions of the plurality of simulated hair strands in a Wachspress coordinate system from the first polygonal mesh of the first character to the second polygonal mesh of the second character to obtain the transferred root positions of the plurality of transferred simulated hair strands in the Wachspress coordinate system.

In some embodiments, determining the first center of mass of the root positions of the plurality of simulated hair strands on the first character comprises determining an average position of the roots of the plurality of simulated hair strands on the first character.

In some embodiments, determining the transferred tip position based on the center of mass, the transferred center of mass, the rotational matrix and a tip position comprises rotating a vector extending from the center of mass to the tip position based at least in part on the rotational matrix to obtain a rotated vector and adding the rotated vector to the transferred center of mass.

In some embodiments, the one or more shape-preserving constraints comprise one or more positional constraints. In some embodiments, the one or more shape-preserving constraints comprise one or more rod constraints. In some embodiments, the one or more rod constraints are selected from the group consisting of size constraints, stretch constraints, shear constraints, bending constraints, twisting constraints and orientation constraints.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a tool for styling simulated hairs while automatically maintaining (or substantially maintaining) the inherent characteristics of the simulated hairs and optionally maintaining (or substantially maintaining) clumping of the simulated hairs.

Figure 1:
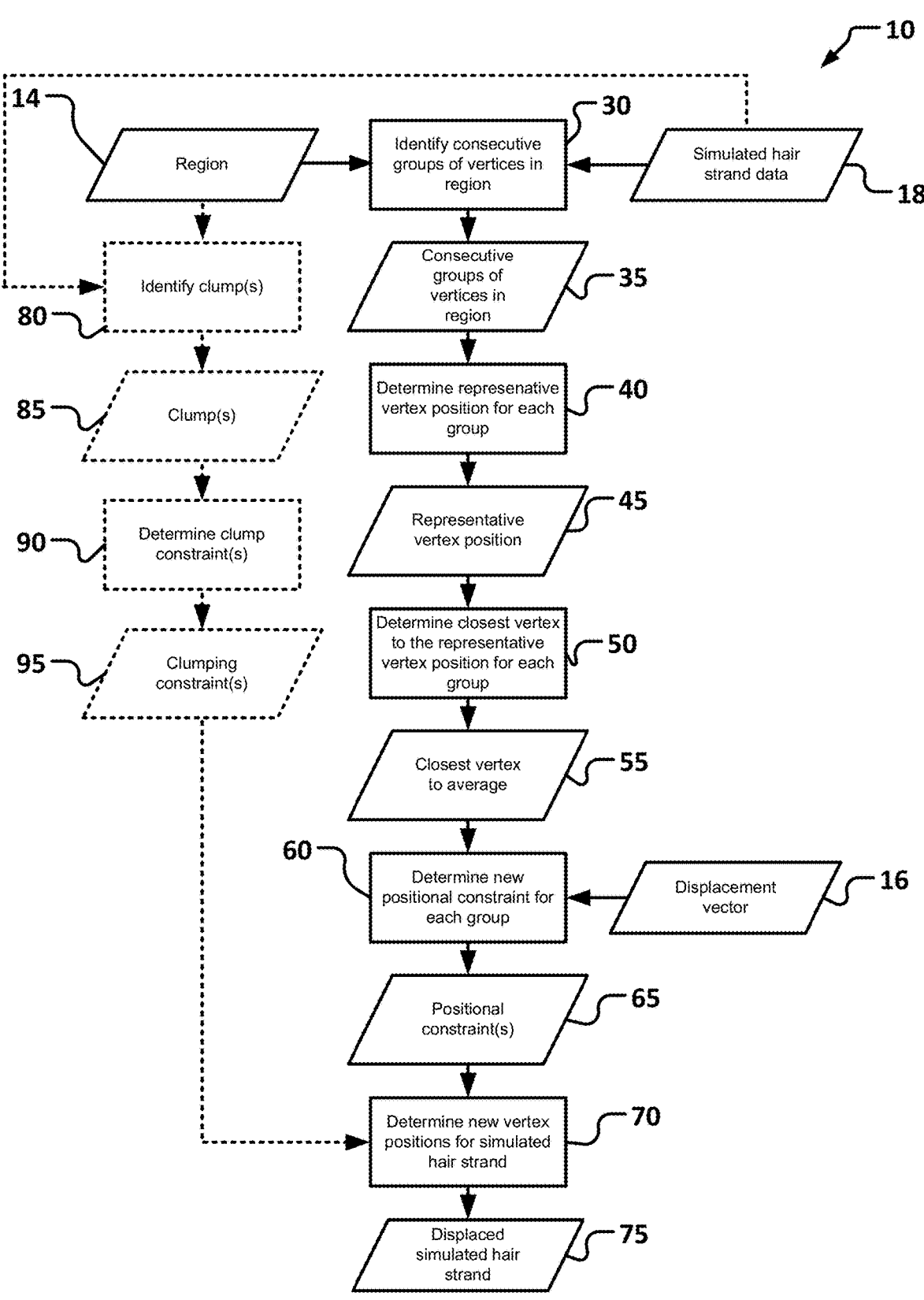
FIG. 1 depicts an exemplary, non-limiting method for styling simulated hair strands according to one embodiment of the invention.

FIG. 1 depicts an exemplary, non-limiting method 10 for styling simulated hairs while automatically maintaining (or substantially maintaining) the inherent characteristics of the simulated hairs and optionally maintaining (or substantially maintaining) clumping of the simulated hairs. Method 10 may be implemented in software on a suitably configured (e.g. programmed) computer comprising a processor, a display and/or other hardware suitably configured for interfacing with the computer (e.g. via a graphical user interface).

Figure 2:
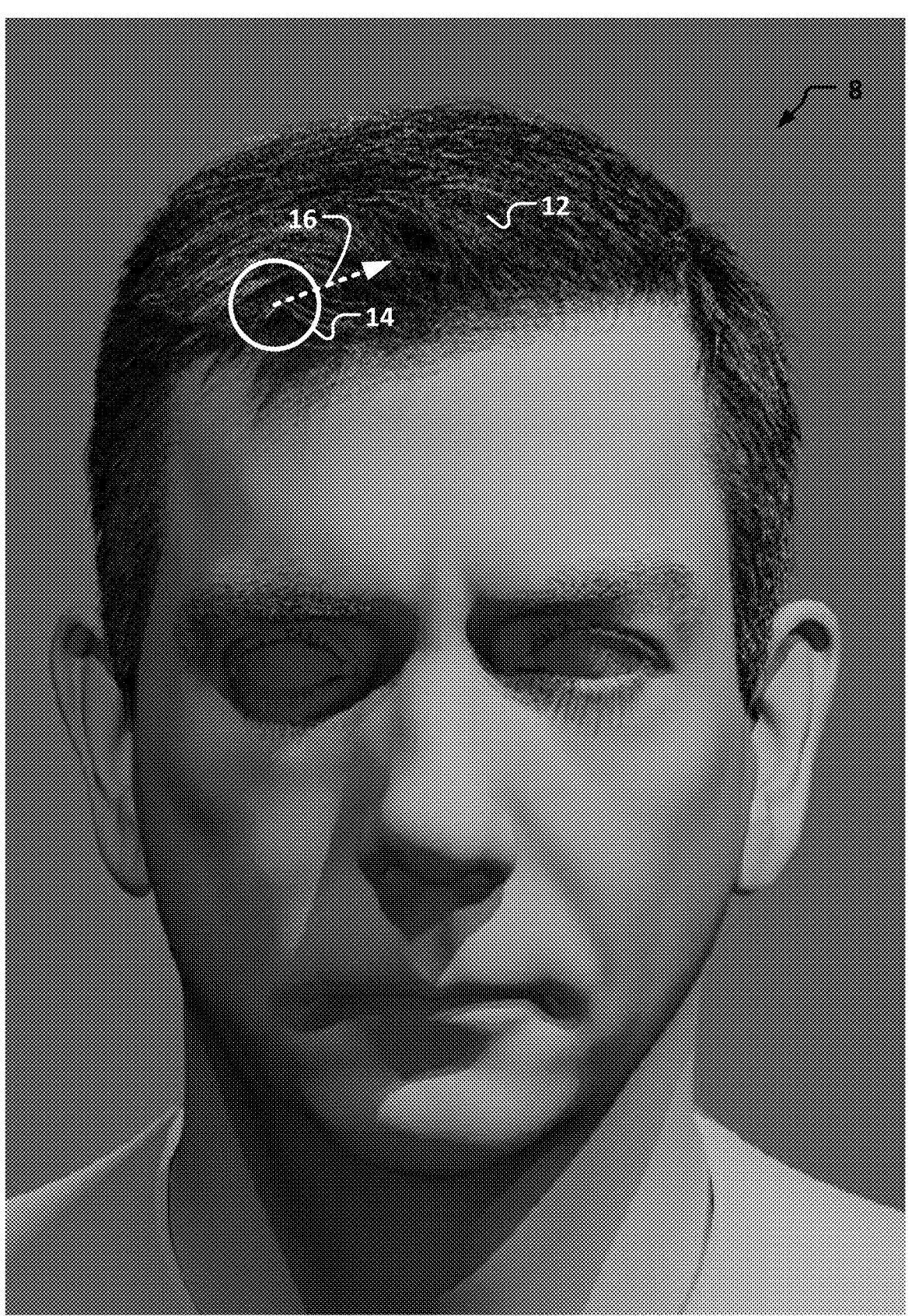
FIG. 2 is a schematic depiction of a computer software-based tool for styling simulated hair strands according to one embodiment of the invention.

Method 10 may be implemented to manipulate the position of on one or more simulated hair strands 12 (see, for example, hair 12 shown in FIG. 2). In some embodiments, method 10 is implemented to directly manipulate individual simulated hair strands 12. In some embodiments, method 10 is implemented to manipulate one or more guide curves, and each guide curve represents a plurality of simulated hair strands 12.

Method 10 receives or otherwise obtains or has access to hair strand data 18 as input. Hair strand data 18 may be input by a user and/or other suitably configured hardware or software (e.g. from another software program or from a networked computer), although this is not necessary and any method 10 may receive hair strand data 18 by any suitable technique. Hair strand data 18 may comprise digital representations of simulated hair strand(s) 12, which may comprise, for each such hair strand 12, a plurality of vertices and one or more segments connecting adjacent vertices. Hair strand data 18 may describe one or more characteristics of simulated hair strand(s) 12 of a character. Such characteristics may include information identifying one or more shape-preserving constraints such as, for example: (1) the positional constraints of each vertex of each simulated hair strands 12 (e.g. constraints directed to limiting the position of each vertex) as described in, for example, the paper by M. Muller et al. published in 2006 and entitled *Position Based Dynamics*, which is hereby incorporated herein by reference; and (2) rod constraints such as, for example, size, stretch, shear, bending, twisting and/or orientation constraints of each segment connecting the adjacent vertices of simulated hair strands 12 (e.g. constraints directed to limiting how much each segment can be stretched, bent, twisted, etc.) as described in, for example, the paper by T. Kugelstadt and E. Schömer published in 2016 and entitled *Position and Orientation Based Cosserat Rods*, which is hereby incorporated herein by reference.

Method 10 receives or otherwise obtains or has access to an indication of a region 14 to be manipulated and a displacement vector 16. Region 14 and/or displacement vector 16 may be input by a user and/or other suitably configured hardware or software (e.g. from another software program or from a networked computer), although this is not necessary and any method 10 may receive region 14 and/or displacement vector 16 by any suitable technique. Region 14 may define the size and location of a region in or around which it is desirable to manipulate one or more strands of simulated hair 12. While region 14 is depicted herein in two dimensions for illustrative purposes, it should be understood that region 14 may be a three-dimensional space. Displacement vector 16 may define the size and direction of a desired manipulation of the simulated hair strands 12 (or portions of simulated hair strands 12) that are within or near region 14.

A user may provide input region 14 and displacement vector 16 in any suitable manner. For example, in some embodiments, a user employs a pointing indicator (e.g. a cursor) or a touchscreen to input region 14 and displacement vector 16. The pointing indicator may be controlled by a mouse, joystick, trackball, motion capture device, and/or other suitable pointing device hardware. The user may select a location of region 14 by hovering the pointing indicator over a portion of a display and clicking, by touching a finger to a touchscreen or by other suitable gesture or means. The size of region 14 may be pre-selected and/or may be user-definable (e.g. by allowing a user to input a radius, a volume and/or some other dimension of region 14 before or after selecting the location of region 14). The user may then input a size and direction of displacement vector 16 by, for example, dragging the pointing indicator (or their finger) across the display while continuing to click the pointing device or touch the screen, as the case may be.

FIG. 2 depicts an exemplary, non-limiting image of a simulated character 8 having a plurality of simulated hair strands 12. A circle identifies the location and size of region 14 while an arrow identifies the size and direction of displacement vector 16. A user, when employing method 10 on a suitably configured computer, may see a circle or some other indicia similar to that depicted in FIG. 2 to identify the location and size of region 14 as they move their pointing indicator, finger, etc.

Returning to FIG. 1, step 30 of method 10 comprises identifying the portions of simulated hair strands 12 within region 14 to be manipulated. Specifically, step 30 may comprise identifying vertices located in region 14. In some embodiments, as described herein, step 30 may comprise identifying consecutive groups of vertices located in region 14. In some embodiments, manipulation of portions of simulated hair strands 12 within region 14 may indirectly affect portions of simulated hair strands 12 outside of region 14, as described further herein.

Figure 3:
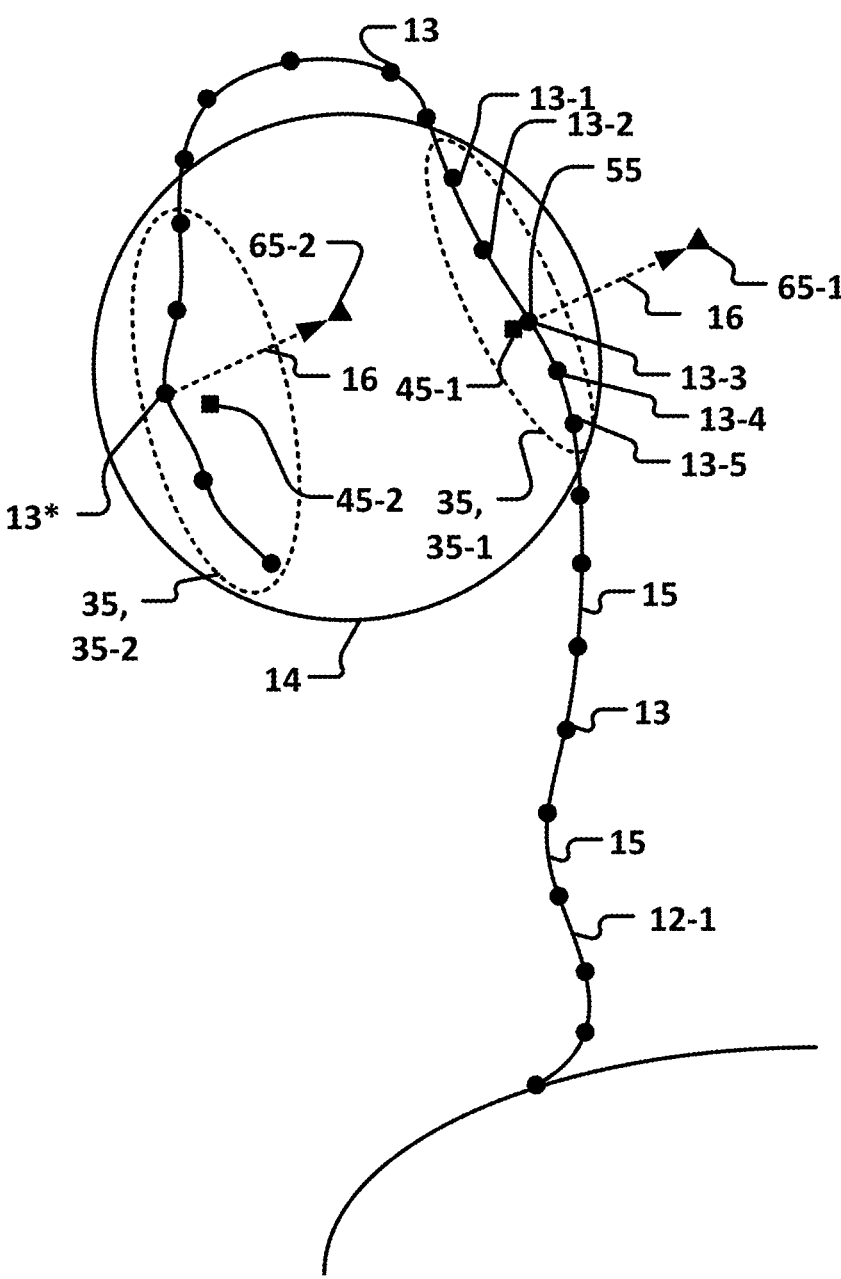
FIG. 3 is a schematic depiction of a simulated hair strand according to one embodiment of the invention.

FIG. 3 is a schematic depiction of a first simulated hair strand 12-1 and a user-selected region 14. First simulated hair strand 12-1 is defined by a plurality of vertices 13 and a plurality of segments 15 interconnecting adjacent vertices. For simplicity, the number of vertices 13 and segments 15 of first simulated hair strand 12-1 is depicted as being much lower than in practice, but it should be understood that a simulated hair strand could be defined by any suitable number of vertices 13 and segments 15.

As can be seen from FIG. 3, a number of vertices 13 of first simulated hair strand 12-1 are located within region 14. The vertices 13 within region 14 may be arranged into consecutive groups 35 of vertices 13. Specifically, a first consecutive group 35-1 (indicated by dashed lines) of vertices 13 is located in region 14 and a second consecutive group 35-2 (also indicated by dashed lines) of vertices 13 is also located within region 14. A consecutive group 35 of vertices 13 may be defined as a group of one or more vertices 13 within region 14 wherein: if the consecutive group 35 comprises more than one vertex 13, then each vertex 13 in the consecutive group 35 is directly connected (e.g. by a single segment 15 without any intervening vertices 13) to another vertex 13 in the consecutive group 35; and if the consecutive group 35 comprises only a single vertex 13, then the single vertex is not directly connected to any other vertices 13 in region 14. If a vertex 13 is not within region 14, it cannot be part of a consecutive group 35. If a particular vertex 13 is not directly connected (e.g. by a single segment 15 without any intervening vertices 13) to another vertex 13 within a consecutive group 35, then the particular vertex cannot be part of that consecutive group 35. If a vertex 13 located within region 14 is not connected to any other vertices 13 within region 14, then it may be part of a consecutive group 35 comprising a single vertex 13—i.e. itself.

Figure 4:
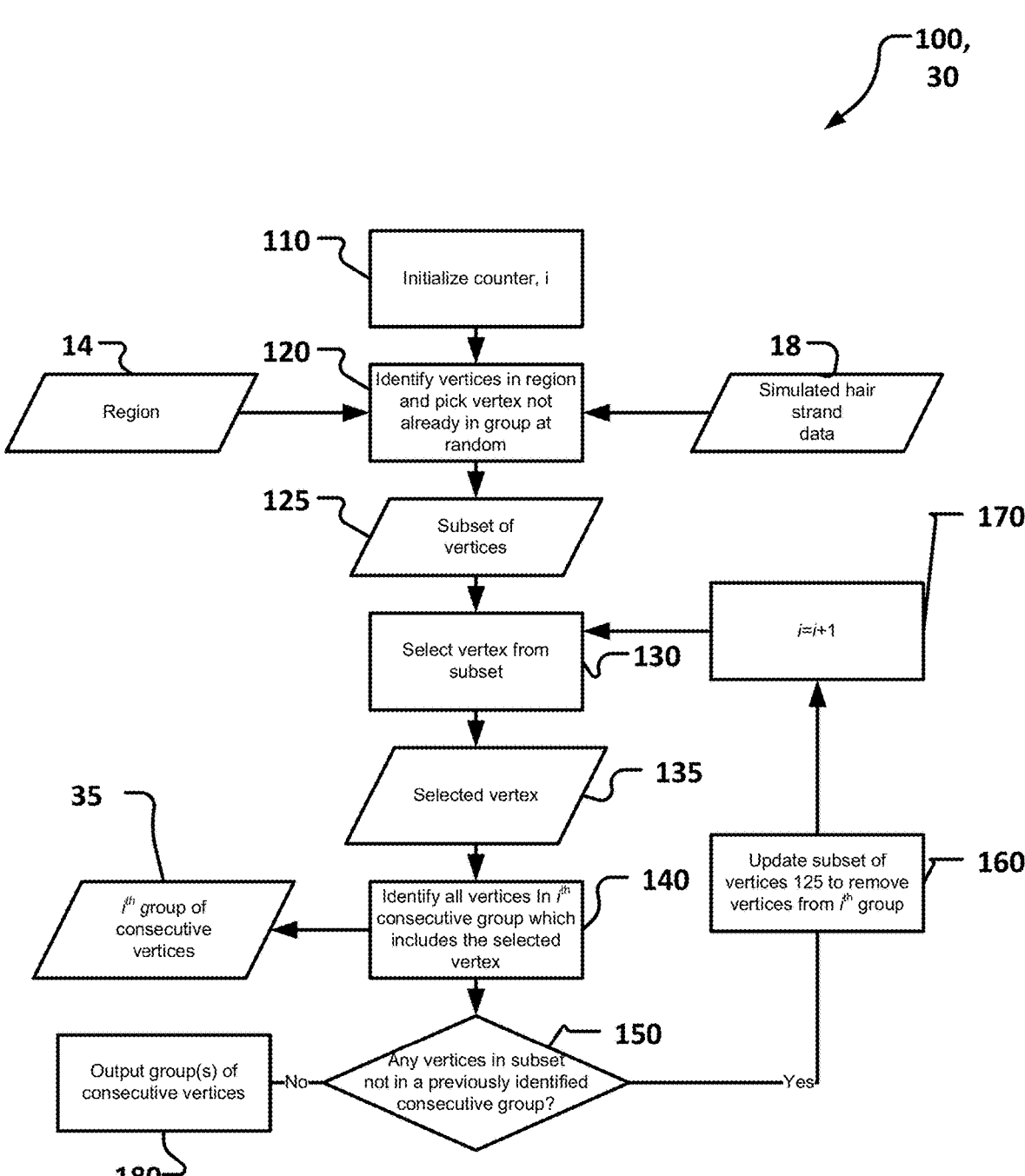
FIG. 4 depicts an exemplary, non-limiting method for identifying consecutive groups of vertices of a simulated hair strand according to one embodiment of the invention.

Any suitable technique or method may be employed at step 30 to identify consecutive group(s) 35 of vertices located in region 14. FIG. 4 depicts an exemplary, non-limiting embodiment of a method 100 which may be used in step 30 for identifying consecutive group(s) 35 of vertices located in region 14.

Method 100 starts at step 110. At step 110, a counter, i, is initialized (e.g. at one). The counter, i, represents the instance of the consecutive group 35 identified. For example, method 100 may start by identifying a first consecutive group (e.g. consecutive group 35-1 in FIG. 3) with i equal to one and then a second consecutive group (e.g. consecutive group 35-2 in FIG. 3) with i equal to two. While method 100 is described herein as employing counter, i, it should be understood that this is not mandatory and steps 120 to 140 may be repeated as desired using other suitable techniques.

Step 120 of method 100 comprises identifying all of the vertices 13 of simulated hair strands 12 within region 14. Step 120 may receive, as input, a size and location of region 14 or some other suitable indicia defining region 14 and simulated hair strand data 18. Any suitable technique may be used at step 120 to identify all of the vertices 13 of simulated hair strands 12 within region 14. Step 120 outputs a subset 125 of vertices 13 which comprises all of vertices 13 within region 14.

Step 130 of method 100 comprises picking a vertex 135 (e.g. a random vertex 135) from subset 125. Selected vertex 135 may be picked using any suitable technique, including, for example any suitable random selection technique.

Step 140 of method 100 comprises identifying all vertices 13 of subset 125 that belong to a consecutive group 35 that includes selected vertex 135. Step 140 may comprise: (1) defining the $i^{th}$ consecutive group 35-i to include selected vertex 135; (2) attempting to locate a vertex 13 in subset 125 directly connected (e.g. by a single segment 15 without any intervening vertices) to a vertex 13 in the $i^{th}$ consecutive group 35-i; (3) if such a vertex 13 is located in step (2), then add the located vertex 13 to the $i^{th}$ consecutive group 35-i; and (4) repeat steps (2) and (3) until there are no more vertices 13 directly connected to any vertices in the $i^{th}$ consecutive group 35-i (i.e. until step (2) fails to locate a vertex). The vertices 13 so identified form the $i^{th}$ consecutive group 35-i. Step 140 may rely on simulated hair strand data 18 to determine which vertices 13 are directly connected to one another.

Step 150 comprises determining if any vertices 13 of subset 125 are not included in a previously identified consecutive group 35. If all vertices 13 of subset 125 are included in a previously identified consecutive group 35, then method 100 concludes by outputting all of the identified consecutive groups 35 of vertices 13 at step 180.

If one or more vertices 13 of subset 125 are not included in a previously identified consecutive group 35, then method 100 continues on to step 160. At step 160 the vertices 13 belonging to the $i^{th}$ consecutive group 35-i are removed from subset 125. At step 170, the counter, i, is incremented, before returning to step 130 for another iteration, so that a further consecutive group 35 of vertices may be identified. Steps 130 through 170 may be repeated until all vertices 13 within region 14 are arranged into consecutive groups 35—i.e. until the step 150 inquiry is negative.

Returning to method 10 (FIG. 1), after consecutive group(s) 35 of vertices 13 in region 14 are identified at step 30, method 10 continues on to step 40. Step 40 comprises determining a representative vertex position 45 for each consecutive group 35 of vertices 13. In some embodiments, the step 40 representative vertex position 45 for each consecutive group 35 comprises an average vertex position 45 for each consecutive group although other techniques (e.g. a weighted average or a selection of a representative vertex, such as the median vertex, to be the representative vertex position 45) could be used to determine a representative vertex position 45.

In some embodiments, the position of each vertex 13 of simulated hair strands 12 is defined in a three-dimensional Cartesian coordinate system such that the position of a $k^{th}$ vertex may be described in the form $(a_k, b_k, c_k)$ where $a_k$ is the position of the $k^{th}$ vertex along an x axis, $b_k$ is the position of the $k^{th}$ vertex along a y axis and $c_k$ is the position of the $k^{th}$ vertex along a z axis. Similarly, the representative (e.g. average) vertex position 45 ($P_{avg}$) for each consecutive group 35 can be represented in the form $(a_{avg}, b_{avg}, c_{avg})$. The average vertex position 45 ($P_{avg}$) for each consecutive group 35 may be determined according to Equation (1).

10

$$P_{avg} = (a_{avg}, b_{avg}, c_{avg}) = \qquad (1)$$
$$\left( \frac{a_1 + a_2 + \cdots + a_n}{n}, \frac{b_1 + b_2 + \cdots + b_n}{n}, \frac{c_1 + c_2 + \cdots + c_n}{n} \right)$$

where n is the total number of vertices in the respective group 35. The step 40 process of determining a representative vertex position 45 may be performed once for each consecutive group 35 of vertices identified in step 30.

Step 50 comprises, for each consecutive group 35, identifying a closest vertex 55 by determining which vertex 13 of the consecutive group 35 is closest to the representative (e.g. average) vertex position 45 for that group 35. Referring back to the FIG. 3 example, first group 35-1 comprises vertices 13-1, 13-2, 13-3, 13-4, 13-5. FIG. 3 also shows the approximate average vertex position 45-1 of first group 35-1 and the approximate average vertex position 45-2 of second group 35-2. As can be seen from FIG. 3, vertex 13-3 is closest to average vertex position 45-1 of first group 35-1. Therefore, vertex 13-3 is the closest vertex 55 for first group 35-1. Similarly, vertex 13* is closest to average vertex position 45-2 of second group 35-2. Therefore, vertex 13* is the closest vertex 55 for second group 35-2.

In some embodiments, to determine the closest vertex 13 to the representative (e.g. average) vertex position 45 of a group 35, the distance between each vertex 13 in a group 25 and the representative vertex position 45 of that group 35 may be determined. For example, the distance, $d_k$, between a $k^{th}$ vertex 13 of a group 35 and the representative vertex position 45 of that group 35 can be determined according to Equation (2).

$$d_k = \sqrt{(a_k - a_{avg})^2 + (b_k - b_{avg})^2 + (c_k - c_{avg})^2} \qquad (2)$$

Returning to method 10 of FIG. 1, at step 60, a new positional constraint 65 is determined for each consecutive group 35. New positional constraint 65 may be based on displacement vector 16 and closest vertex 55. New positional constraint 65 may be determined by adding displacement vector 16 to the position of the closest vertex 55 (e.g. by vector addition). FIG. 3 depicts examples of a first new positional constraint 65-1 for first consecutive group 35-1 and a second new positional constraint 65-2 for second consecutive group 35-2 of first simulated strand 12-1.

Step 70 comprises determining new positions for the vertices 13 of simulated hair strands 12 based at least in part on new positional constraint(s) 65. In some embodiments of step 70, new positional constraint 65 may replace a previous positional constraint of the vertex identified as closest vertex 55 (e.g. vertex 13-3 in the depicted embodiment). Step 70 may comprise employing a constraint enforcement process with existing constraints (e.g. which may be part of simulated hair strand data 18 such as one or more positional constraints and/or rod constraints) and the new positional constraint(s) 65. One or more iterations of the constraint enforcement process may be employed at step 70 until desired results are obtained. In some embodiments, a plurality (e.g. two) of iterations of the constraint enforcement process are employed.

In some embodiments, the step 70 constraint enforcement process may employ one or more of the techniques set out in the paper *Position Based Dynamics* by M. Muller et al. published in 2006 and which is hereby incorporated herein by reference.

In some embodiments, each constraint (e.g. new positional constraints 65 and/other constraints such as positional constraints and/or rod constraints that form part of hair strand data 18) is associated with (e.g. defined using) a few degrees of freedom (e.g. positions of vertices and/or segments). The constraint may be satisfied if the corresponding values of the degrees of freedom bring the constraint value to zero. Determining the degrees of freedom may employ constraint projection wherein a constraint gradient (e.g. the derivative of the constraint with respect to the degrees of freedom) is computed. A scaling factor (e.g. a Lagrange multiplier) may then be found which satisfies the constraint along the constraint gradient. In some embodiments, either Jacobi or Gauss-Seidel iteration may be employed in step 70. In some embodiments, constraints are projected from a root 17 of each stand of hair 12 to the tip 21. In some embodiments, positional constraints are enforced first, followed by rod constraints and optionally clump constraints, as discussed further herein.

In some embodiments, the step 70 constraint enforcement process may weight each constraint. For example, to ensure that region 14 and displacement vector 16 (which may be based on user input as discussed herein) have a desirable effect, new positional constraint(s) 65 may be given a relatively higher weight than the constraints (e.g. positional constraints and/or rod constraints) that may be part of simulated hair strand data 18. However, to avoid losing the inherent hair characteristics of simulated hair strands 12 (e.g. as represented by the constraints that are part of simulated hair strand data 18 such as positional constraints and/or rod constraints), new positional constraint(s) 65 should not be weighted too highly. The weights used in step 70 may be based at least in part on the inverse mass of the vertices and segments. In some embodiments, root points are set to zero (e.g. infinite mass), so that they will keep their position on the scalp during step 70. The weights used in step 70 may be between approximately 0.05 and 0.2. In some embodiments, the weights used in step 70 are approximately 0.1. In some embodiments, the weights used in step 70 are user-definable.

Figure 5:
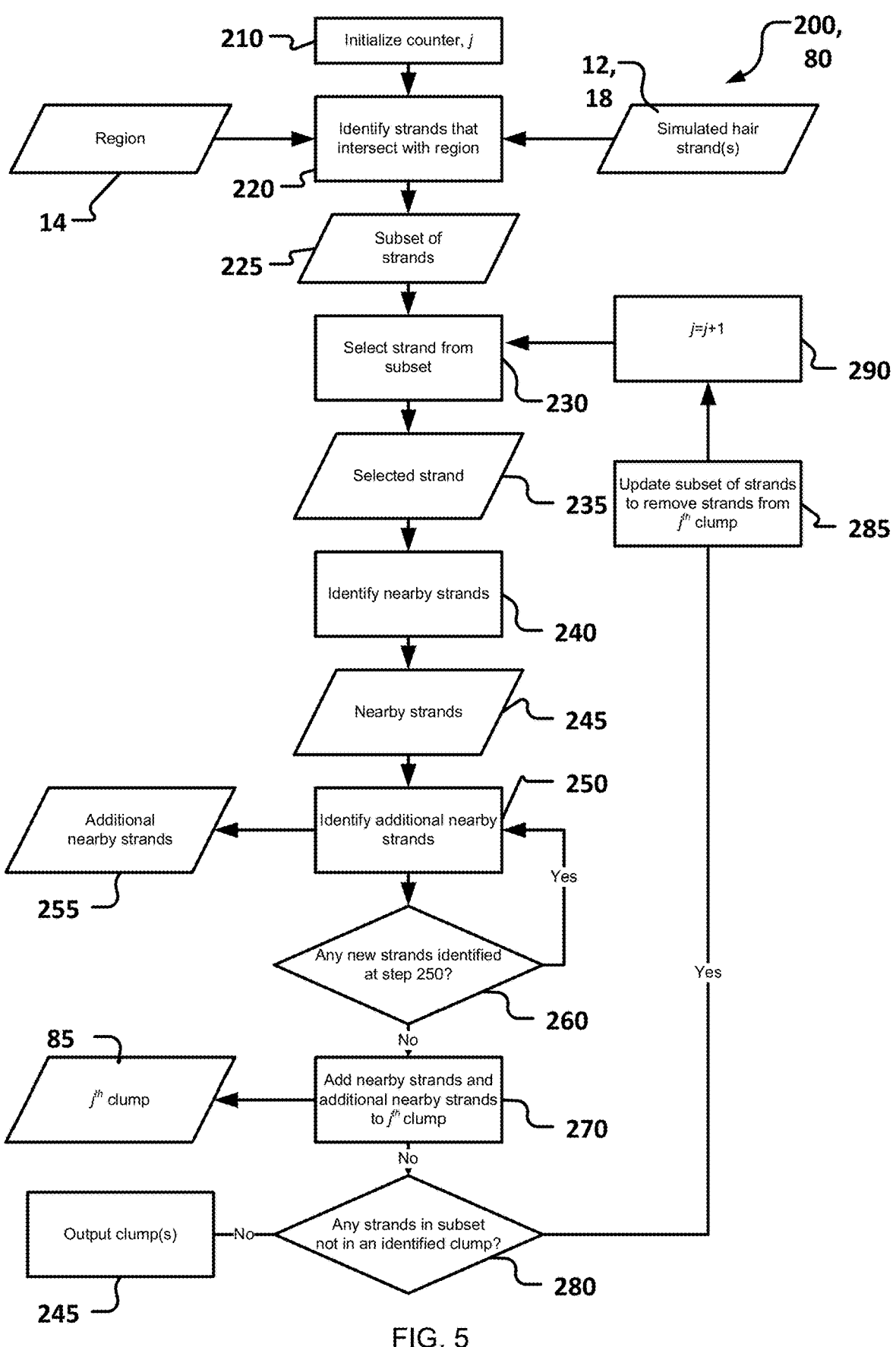
FIG. 5 depicts an exemplary, non-limiting method for identifying clumps of simulated hair strands according to one embodiment of the invention.

In some embodiments, method 10 comprises optional steps 80, 90 for maintaining (or substantially maintaining) clumping of the simulated hairs 12. Step 80 comprises identifying clump(s) 85. Clump(s) 85 may be identified in step 80 by employing any suitable method. FIG. 5 depicts an exemplary, non-limiting method 200 for identifying clump(s) 85 that may be used in step 80.

Method 200 receives or otherwise obtains or has access to region 14 and simulated hair strand data 18 as input.

Method 200 starts at step 210. At step 210, a counter, j, is initialized (e.g. at one). The counter may represent the instance of an identified clump 85. For example, method 200 may start by identifying a first clump 85 with j equal to one and then a second clump 85 with j equal to two. While method 200 is described herein as employing counter, j, it should be understood that this is not mandatory and steps 220 to 270 may be repeated as desired using other suitable techniques.

Step 220 comprises identifying a subset 225 of simulated hair strands 12 comprising simulated hair strands 12 that intersect in whole or in part with region 14. Any suitable method may be employed to identify simulated hair strands 12 that intersect in whole or in part with region 14.

Step 230 of method 200 comprises selecting a strand 235 (e.g. a random strand 235) from subset 225. Selected strand 235 may be picked using any suitable selection technique, such as a random selection technique.

Figure 6:
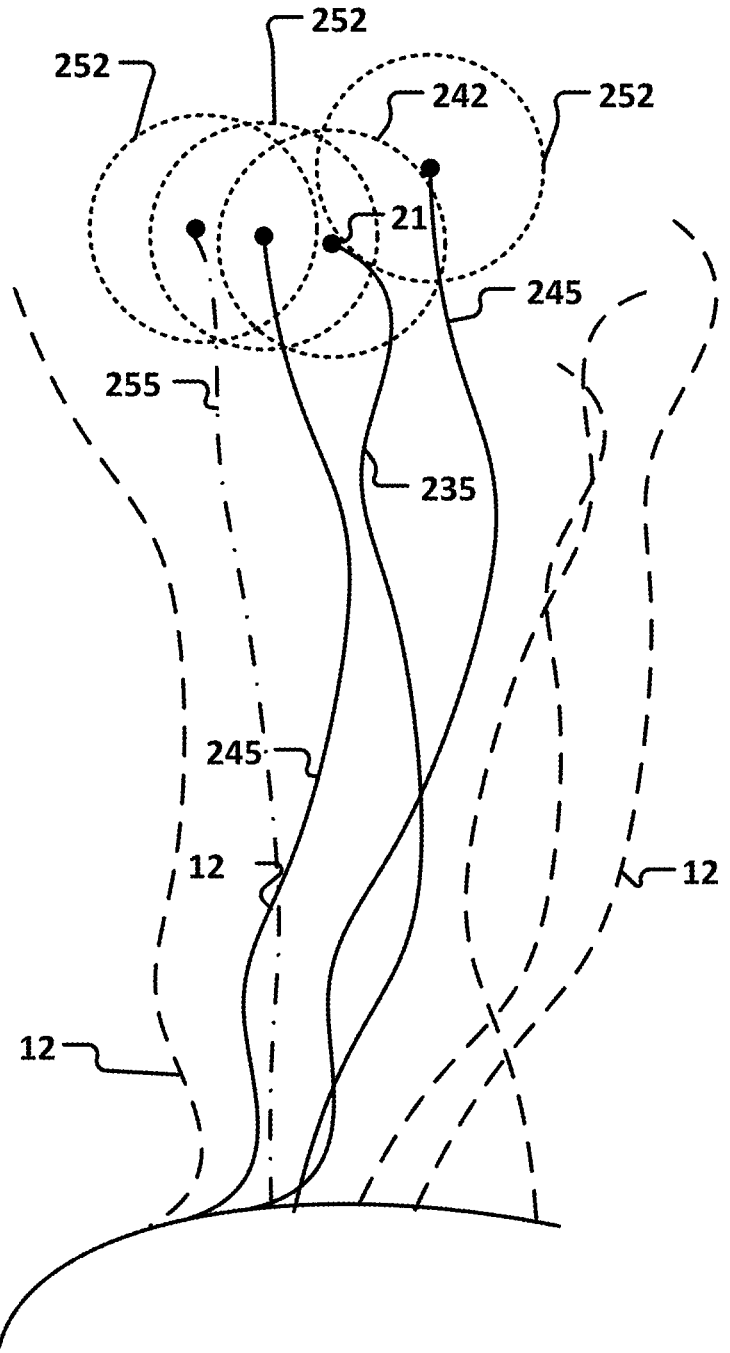
FIG. 6 is a schematic depiction of simulated hair strands according to one embodiment of the invention.

Step 240 of method 200 comprises identifying nearby strands 245. Nearby strands 245 may be identified in various ways. Nearby strands 245 may comprise all simulated hair strands 12 (within subset 225 and/or outside of subset 225)

that intersect with a space 242 centered around a tip 21 of selected strand 235. For example, FIG. 6 is a schematic depiction of an example of a plurality of simulated hair strands 12 including a selected strand 235 selected in step 230. As can be seen from FIG. 6, simulated hair strands 12 shown in solid lines comprise nearby strands 245 (e.g. since the strands shown in solid lines intersect with space 242), while the simulated hair strands 12 shown in stippled lines do not intersect space 242 and, consequently, are not nearby strands to selected strand 235. Step 240 may make use of simulated hair strand data 18 to determine which simulated hair strands 122 intersect space 242.

Space 242 may comprise any suitable sized and shaped (e.g. three-dimensional) space. In some embodiments, a user may define the size and/or shape of space 242 using a suitable parameter (e.g. a radius, volume or the like) thereof. In some embodiments, the size and/or shape of space 242 is a pre-defined parameter of method 200. In some embodiments, space 242 is spherical in shape, although this is not mandatory.

Step 250 of method 200 comprises identifying additional nearby strands 255. Additional nearby strands 255 may comprise simulated hair strands 12 (within subset 225 and/or outside of subset 225) that intersect with a space 252 centered around a tip of any nearby strand 245 identified at step 240 or any additional nearby strand 245 already identified at step 250. Space 252 may have characteristics similar to those of space 242 discussed above. In some embodiments, space 252 may have different characteristics than those of space 242. An exemplary further intersecting strand 255 is shown in FIG. 6.

At step 260, if any additional nearby strands 255 were identified at step 250, method 200 returns to step 250 to identify any new additional nearby strands 255. If no new additional nearby strands 255 are identified at step 250, method 200 continues to step 270 and adds nearby strands 245 and additional nearby strands 255 to $j^{th}$ clump 85.

Step 280 comprises determining if any simulated hair strands 12 of subset 225 are not included in a previously identified clump 85. If all simulated hair strands 12 of subset 225 are included in a previously identified clump 85, then method 200 is done and method 200 outputs all clumps 85 at step 245.

If any simulated strand(s) of hair 12 of subset 225 are not included in a previously identified clump 85, then method 200 continues on to step 285 which involves removing simulated hair strands 12 in the $j^{th}$ clump 85 from subset 225. Method 200 then proceeds to step 290, where the counter, j, is incremented before returning to step 230.

Method 200 then repeats steps 230 through 290 until all simulated hair strands 12 that intersect region 14 are arranged into clumps 85 (i.e. until the step 280 inquiry is negative).

Figure 7:
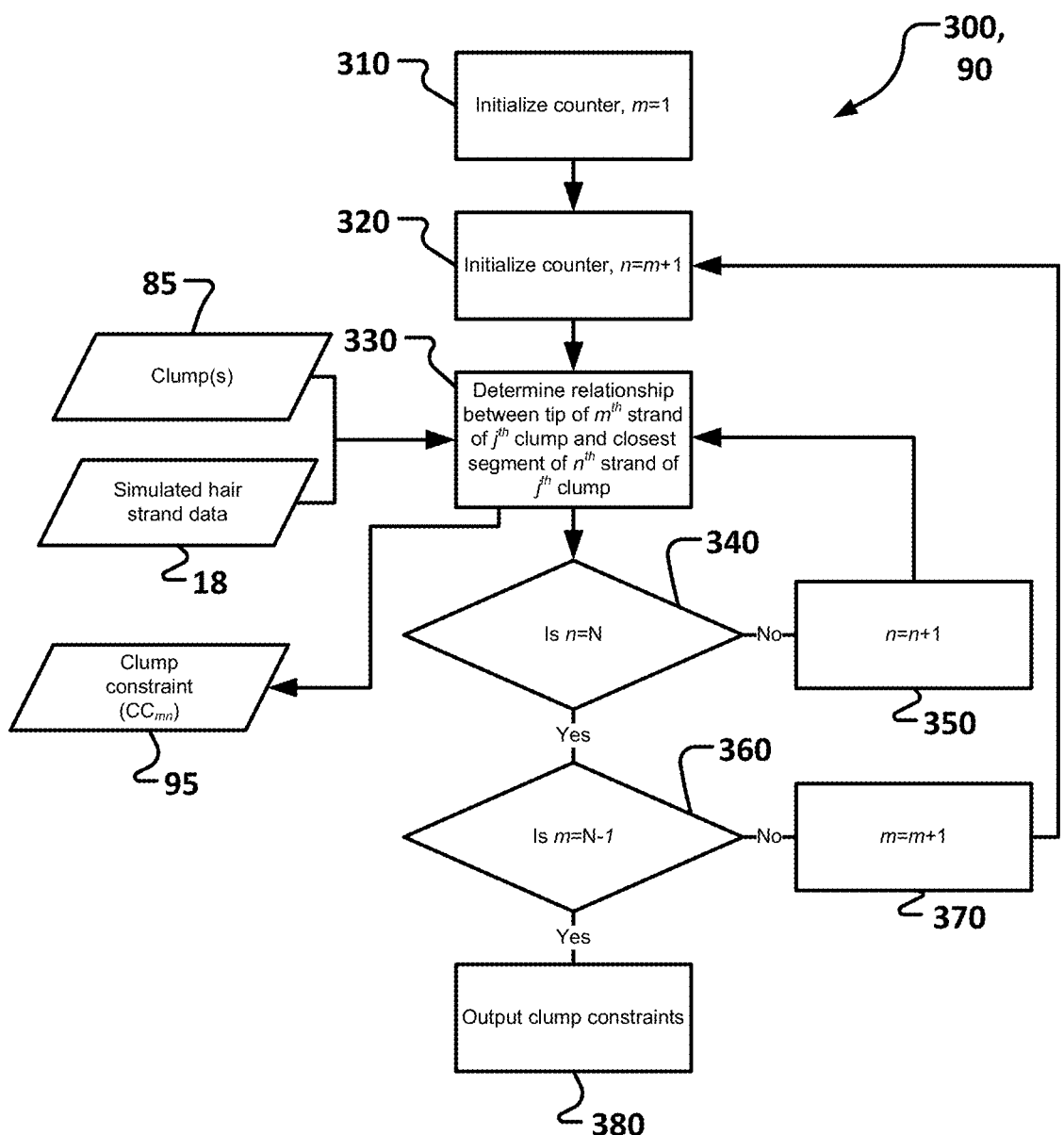
FIG. 7 depicts an exemplary, non-limiting method for determining clump constraints according to one embodiment of the invention.

Returning back to method 10, step 90 comprises determining one or more clumping constraints 95. Clumping constraint(s) 95 may comprise, for each tip 21 of a simulated hair strand 12 of a clump 85, relationships between that tip 21 and each other simulated hair strand 12 of that clump 85. Clumping constraint(s) 95 may be determined by employing any suitable method. FIG. 7 depicts an exemplary, non-limiting method 300 which may be used for determining clumping constraint(s) 95 in step 90.

Method 300 receives, as input, clumps 85 and simulated hair strand data 18.

Method 300 starts at step 310 where a counter, m, is initialized (e.g. to be equal to one). At step 320 a counter, n, is initialized to be equal to m+1. While method 300 is described herein as employing counters, m and n, it should be understood that this is not mandatory and steps of method 300 may be repeated as desired using other suitable techniques.

At step 330, a relationship between a tip 21 of the $m^{th}$ simulated hair strand 12-m of the $j^{th}$ clump 85 and the $n^{th}$ simulated hair strand 12-n of the $j^{th}$ clump 85 is determined. This relationship may be employed as a clump constraint 95. In some embodiments, the relationship between a tip 21 of the $m^{th}$ simulated hair strand 12-m of the $j^{th}$ clump 85 and the $n^{th}$ simulated hair strand 12-n of the $j^{th}$ clump 85 may comprise a distance, $D_{mn}$ between a tip 21 of the $m^{th}$ simulated hair strand 12-m of the $j^{th}$ clump 85 and an intersection point 23 (e.g. the midpoint, the closest point or any other point) of the closest segment 19 of the $n^{th}$ simulated hair strand 12-n of the $j^{th}$ clump 85. In some embodiments, the relationship between a tip 21 of the $m^{th}$ simulated hair strand 12-m of the $j^{th}$ clump 85 and the $n^{th}$ simulated hair strand 12-n of the $j^{th}$ clump 85 comprises a relationship between a tip 21 of the $m^{th}$ simulated hair strand 12-m of the $j^{th}$ clump 85 and end vertices 19A, 19B of closest segment 19 of the $n^{th}$ simulated hair strand 12-n of the $j^{th}$ clump 85.

Figure 8:
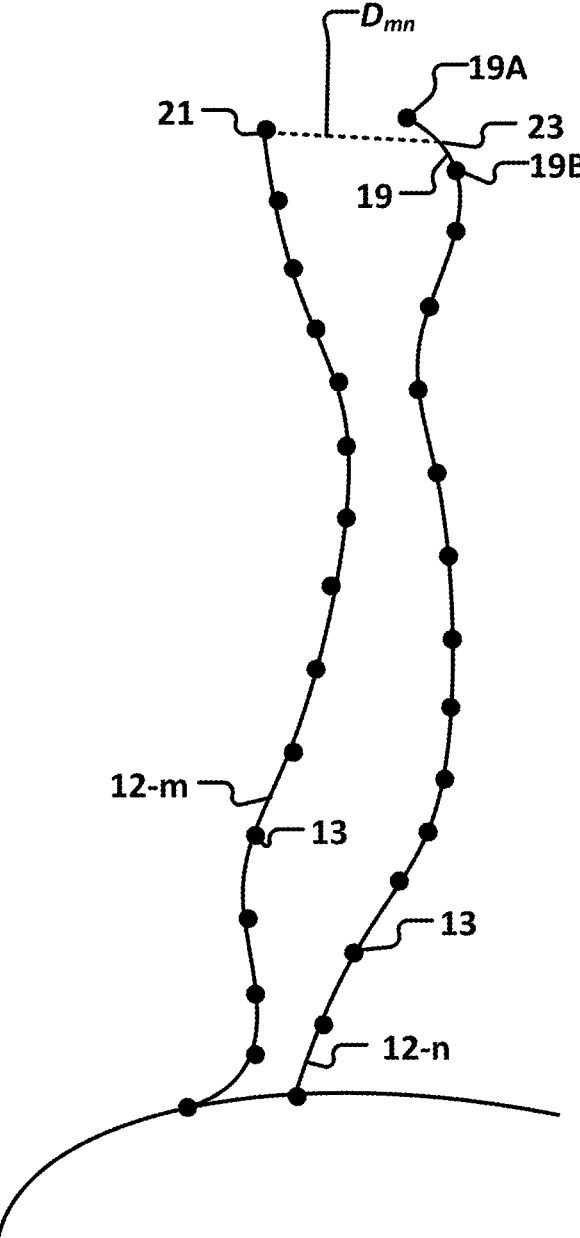
FIG. 8 is a schematic depiction of simulated hair strands according to one embodiment of the invention.

Closest segment 19 of the $n^{th}$ simulated hair strand 12-n of the $j^{th}$ clump 85 may comprise the segment of the $n^{th}$ simulated hair strand 12-n of the $j^{th}$ clump 85 of which any portion is closer to tip 21 of the $m^{th}$ simulated hair strand 12-m than any other portion of any other segment of the $n^{th}$ simulated hair strand 12-n of the $j^{th}$ clump 85. FIG. 8 is a schematic depiction of an $n^{th}$ simulated hair strand 12-n of the $j^{th}$ clump 85 and an $m^{th}$ simulated hair strand 12-m of the $j^{th}$ clump 85. As can be seen from FIG. 8, tip 21 is closest to segment 19 of the $n^{th}$ simulated hair strand 12-n of the $j^{th}$ clump 85 and the intersection point 23 of closest segment 19 of the $n^{th}$ simulated hair strand 12-n of the $j^{th}$ clump 85 is separated from tip 21 by a distance, $D_{mn}$. In some embodiments, where intersection point 23 is the closest point on closest segment 19 of the $n^{th}$ simulated hair strand 12-n of the $j^{th}$ clump 85 to tip 21, distance, $D_{mn}$, comprises the shortest distance between tip 21 and closest segment 19 of the $n^{th}$ simulated hair strand 12-n of the $j^{th}$ clump 85.

The location, $P_i$, of intersection point 23 may be described in relation to the locations, $P_o$, $P_1$, of the end vertices (e.g. vertices 19A, 19B in the FIG. 8 embodiment) of the closest segment (e.g. closest segment 19 of the $n^{th}$ simulated hair strand 12-n of the $j^{th}$ clump 85) according to Equation (3).

$$P_i = P_o(1-W) + P_1 W \qquad (3)$$

where W is the ratio of the distance from $P_i$ to $P_0$ over the distance of $P_0$ to $P_1$.

In some embodiments, clump constraint 95 is defined according to Equation (4).

$$C = |P_0(1-W) + P_1 W - P_2| - D_{mn} \qquad (4)$$

where $P_2$ is the location of the tip (e.g. tip 21). The Equation (4) clump constraint 95 may be enforced by setting C to zero to ensure that $P_0$, $P_1$ and $P_2$ meet clump constraint 95.

Constraint gradients for the Equation (4) clump constraint 95 may be obtained by taking the partial derivatives of Equation (4) with respect to each of $P_0$, $P_1$ and $P_2$ to thereby obtain Equations (5) to (7).

$$\nabla_{P_0} C = \frac{P_o(1-W) + P_1 W - P_2}{|P_o(1-W) + P_1 W - P_2|}(1-W) \qquad (5)$$

-continued $$\nabla_{P_1} C = \frac{P_o(1-W) + P_1 W - P_2}{|P_o(1-W) + P_1 W - P_2|} W \qquad (6)$$

$$\nabla_{P_2} C = \frac{P_o(1-W) + P_1 W - P_2}{|P_o(1-W) + P_1 W - P_2|}(-1) \qquad (7)$$

The constraint gradients set out in Equations (5) to (7) may be employed, for example, for a constraint enforcement process according to the paper Position Based Dynamics by M. Muller et al. published in 2006.

By repeating step 330 for every combination of two simulated hair strands 12 of each $j^{th}$ clump 85, clump constraints 95 for each combination of two simulated hair strands 12 of each clump 85 may be obtained. For example, after step 330, if counter, n, is less than the number, N, of simulated hair strands 12 in $j^{th}$ clump 85 at step 340, then counter, n, is increased at step 350 and step 330 is repeated. Steps 330 to 350 are repeated until counter, n, is equal to the number, N, of simulated hair strands 12 in $j^{th}$ clump 85 at step 340 and then method 300 continues to step 360. If, at step 360, counter, m, is less than N−1, then counter, m, is increased at step 370 and steps 320 to 350 are repeated until counter, m, is equal to N−1, at step 360. If counter, m, is equal to N−1, at step 360, then method 300 ends by outputting clump constraints 95 for each combination of two simulated hair strands 12 of each clump 85 at step 380.

Returning to method 10, if optional steps 80 and 90 are performed, then step 70 of method 100 comprises determining new positions for vertices 13 of simulated hair strands 12 based at least in part on positional constraint(s) 65 and clumping constraints 95. Step 70 may otherwise be substantially the same as described herein.

In this way, method 10 may optionally allow for manipulation of one or more simulated hair strands 12 while maintaining (or substantially maintaining) clumping of the simulated hair strands 12 being directly manipulated and other nearby simulated hair strands 12 (as manifested in the form of clumping constraints 95) and while maintaining (or substantially maintaining) inherent shape characteristics of the simulated hair strands 12 being directly manipulated (as manifested in the form of positional constraints 65).

Another aspect of the invention provides methods and tools for transferring at least a portion of a simulated hair style from a first character having a first mesh to a second character having a second mesh.

Figure 9:
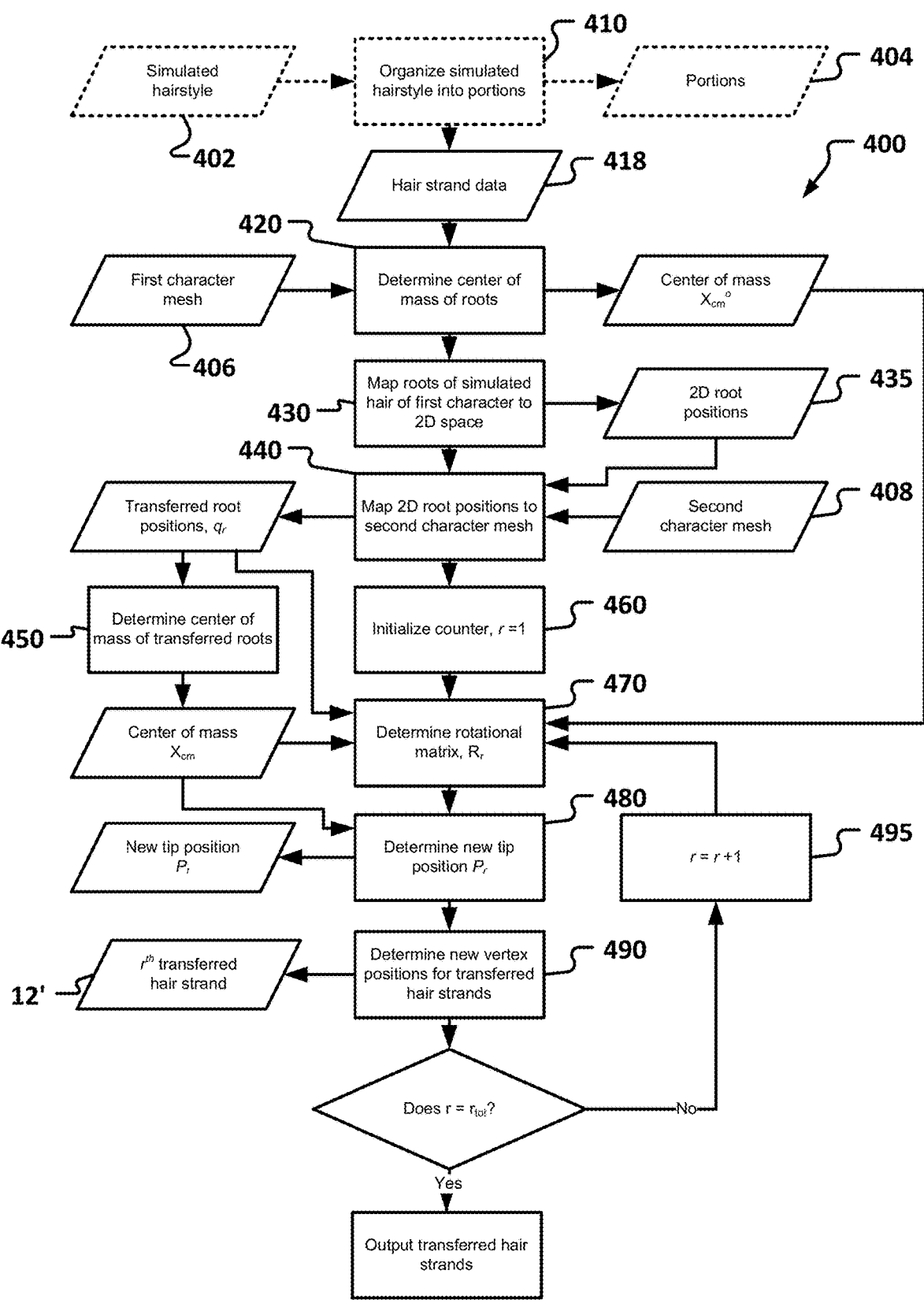
FIG. 9 depicts an exemplary, non-limiting method for transferring at least a portion of a simulated hair style from a first character to a second character according to one embodiment of the invention.
Figure 10:
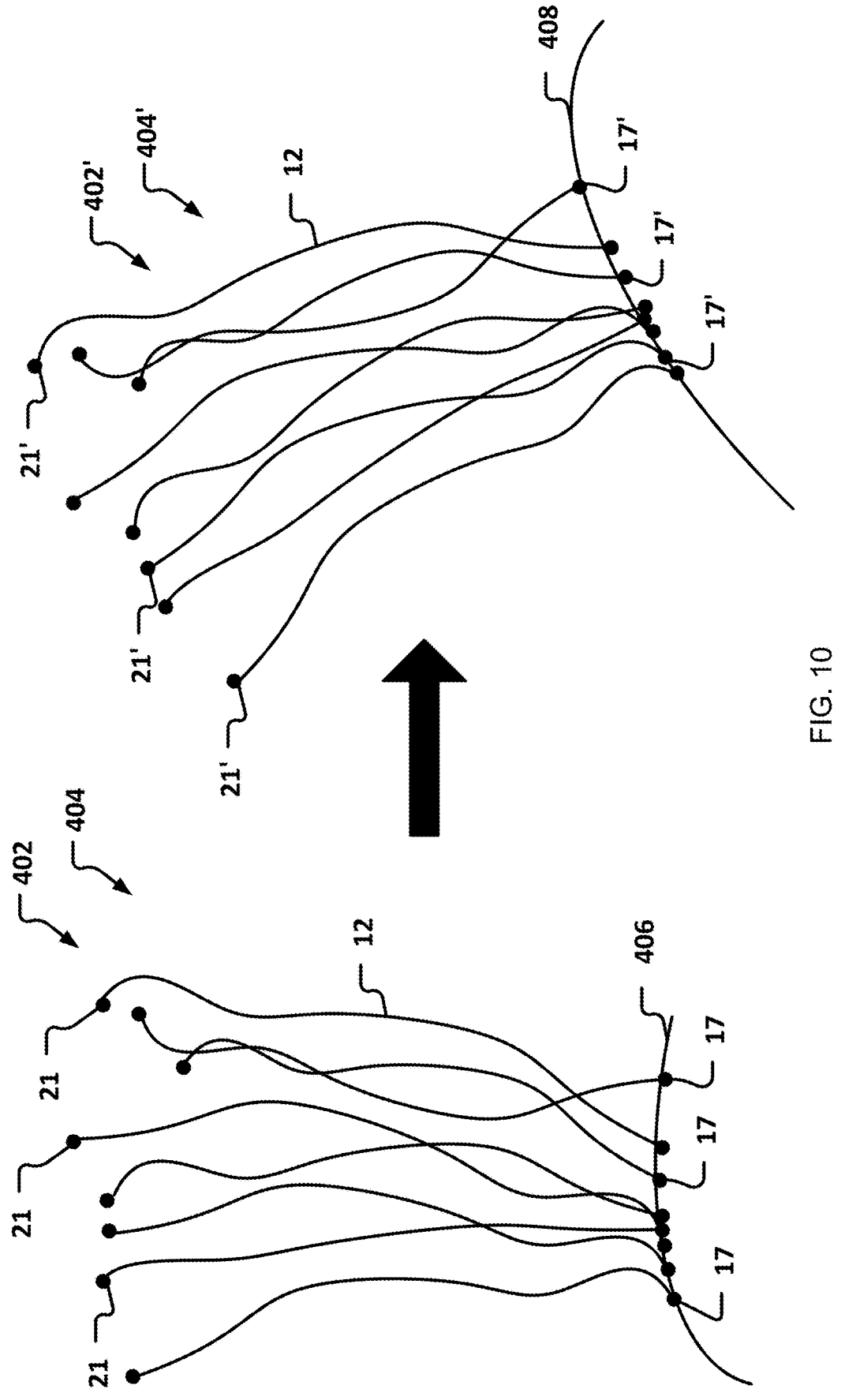
FIG. 10 is a schematic depiction of a transfer of at least a portion of a simulated hair style from a first character to a second character according to one embodiment of the invention.

FIG. 9 depicts an exemplary, non-limiting method 400 for transferring at least a portion of a simulated hair style from a first character represented, in part, by a first mesh to a second character represented, in part, by a second mesh. FIG. 10 is a schematic depiction of a portion 404 of a simulated hair style 402 being transferred from a first mesh 406 of a first character to a second mesh 408 of a second character to form a portion 404' of a transferred hair style 402'.

Method 400 may be implemented to transfer one or more simulated hair strands 12 from first mesh 406 to second mesh 408. In some embodiments, method 400 is implemented to directly manipulate individual simulated hair strands 12. In some embodiments, method 400 is implemented to manipulate one or more guide curves, and each guide curve represents a plurality of simulated hair strands 12.

Method 400 may be employed on a portion-by-portion basis. For example, prior to implementing method 400 (or at optional step 410 of method 400), simulated hair style 402 may be separated into a plurality of portions 404. Portions

404 may be identified using any suitable method. In some embodiments, portions 404 are identified using a method similar to clump identification method 200, described herein. It may be desirable to employ method 400 on a clump-by-clump basis as this will have the effect of preserving clumping characteristics of hair style 402 and increasing fidelity of the transferred hair style 402' to the original hair style 402. In some embodiments, simulated hair style 402 is separated into a user-specified number of portions 404. In some embodiments, the number of portions is based at least in part on a user-specified portion dimension (e.g. similar to choosing the size of space 242 or space 252 in method 200). In some embodiments, the number of portions used in method 400 is greater than the number of clumps in hair style 402. Nonetheless, hair style 402 could be separated into portions using any suitable criteria such as number of hair strands, surface area of mesh, similarity of shapes of hair strands 12, etc.

Method 400 receives hair strand data 418 as input. Hair strand data 418 may describe one or more characteristics of simulated hair strand(s) 12 of the first character. Such characteristics may include information identifying: (1) the positional constraints of each vertex of each simulated hair strands 12 (including a tip position, p, and a root position, q); and (2) the rod constraints of each segment connecting the adjacent vertices of simulated hair strands 12. For the purpose of method 400, each simulated hair strand 12 of portion 404 may be referred to by a number, r, where $r_{tot}$ is the total number of simulated hair strands 12 of portion 404.

At step 420, the center of mass or centroid, $X_{cm}^{o}$, of roots 17 of simulated hair strands 12 of portion 404 of simulated hair style 402 is determined based on root positions, $q_r^{o}$, of roots 17 on first character mesh 406. For example, the center of mass, $X_{cm}^{o}$, of roots 17 of simulated hair strands 12 of portion 404 of simulated hair style 402 is may be the average of root positions, $q_r^{o}$, of roots 17 on first character mesh 406.

At step 430, the positions, $q_r^{o}$, of the roots of simulated hair strands 12 of portion 404 on first character mesh 406 are mapped from a three-dimensional coordinate system to a two-dimensional coordinate system to create two-dimensional root positions 435. Root positions 435 may be obtained by conventional UV mapping techniques. Such a two-dimensional coordinate system is commonly referred to as "UV space".

At step 440, two-dimensional root positions 435 are mapped to second character mesh 408 to obtain transferred root positions, $q_r$, of roots 17' of transferred simulated hair strands 12' of portion 404' of transferred simulated hair style 402'.

In some embodiments, the first and second character meshes 406, 408 are triangular meshes. The positions, $q_r^{o}$, of the roots of simulated hair strands 12 of portion 404 on the triangular first character mesh 406 are mapped from the three-dimensional coordinate system first character mesh 406 to a two-dimensional coordinate system corresponding to first character mesh 406. In some embodiments, mapping the positions, $q_r^{o}$, of the roots of simulated hair strands 12 of portion 404 from the three-dimensional coordinate system to the two-dimensional coordinate system employs barycentric coordinates. The barycentric coordinates may be employed to determine two-dimensional root positions 435 on a two-dimensional coordinate system corresponding to first character mesh 406. Two-dimensional root positions 435 on the two-dimensional coordinate system corresponding to first character mesh 406 may then be transferred to a two-dimensional coordinate system corresponding to second character mesh 408. Two-dimensional root positions 435 on the two-dimensional coordinate system corresponding to second character mesh 408 may then be converted to barycentric coordinates before being reconstructed in three dimensions on the triangular second character mesh 408 to obtain transferred root positions, $q_r$, of roots 17' of transferred simulated hair strands 12' of portion 404' of transferred simulated hair style 402'.

In some embodiments, the first and second character meshes 406, 408 are polygonal meshes. The positions, $q_r^{o}$, of the roots of simulated hair strands 12 of portion 404 on the polygonal first character mesh 406 are mapped from the three-dimensional coordinate system first character mesh 406 to a two-dimensional coordinate system corresponding to first character mesh 406. In some embodiments, mapping the positions, $q_r^{o}$, of the roots of simulated hair strands 12 of portion 404 from the three-dimensional coordinate system to the two-dimensional coordinate system employs Wachspress coordinates. The Wachspress coordinates may be employed to determine two-dimensional root positions 435 on a two-dimensional coordinate system corresponding to first character mesh 406. Two-dimensional root positions 435 on the two-dimensional coordinate system corresponding to first character mesh 406 may then be transferred to a two-dimensional coordinate system corresponding to second character mesh 408. Two-dimensional root positions 435 on the two-dimensional coordinate system corresponding to second character mesh 408 may then be converted to Wachspress coordinates before being reconstructed in three dimensions on the polygonal second character mesh 408 to obtain transferred root positions, $q_r$, of roots 17' of transferred simulated hair strands 12' of portion 404' of transferred simulated hair style 402'.

In some embodiments, transferred root positions, $q_r$, of roots 17' of transferred simulated hair strands 12' of portion 404' of transferred simulated hair style 402' are obtained without first transferring the positions, $q_r^{o}$, of the roots of simulated hair strands 12 of portion 404 on first character mesh 406 to a two-dimensional coordinate system but instead are otherwise determined.

At step 450, the center of mass, $X_{cm}$, of transferred roots 17' of simulated transferred hair strands 12' of transferred portion 404' of transferred simulated hair style 402' is determined based on transferred root positions, $q_r$, of transferred roots 17' on second character mesh 408. In some embodiments, center of mass, $X_{cm}$, is the average of the transferred root positions, $q_r$, of transferred roots 17' on second character mesh 408.

Steps 470 to 490 may be repeated for each instance, r, of simulated hair strand 12 of portion 404. In some embodiments, steps 470 to 490 for different instances of simulated hair strands 12 may occur simultaneously, while in others, steps 470 to 490 may occur in series for different instances of simulated hair strands 12. Method 400 provides one exemplary, non-limiting, example of repeating steps 470 to 490 in series, but it should be understood that this is not necessary.

In the illustrated FIG. 9 example, at step 460, a counter, r, representing the instance of a simulated hair strand 12 (and corresponding transferred simulated hair strand 12') is initialized. At step 470, a rotational matrix, $R_r$, for the $r^{th}$ simulated hair strand 12 of portion 404 (and corresponding transferred simulated hair strand 12') is determined.

Rotational matrix, $R_r$, provides a transformation for determining a transferred tip position, $p_r$, of tip 21' of the $r^{th}$ simulated transferred hair strand 12' of transferred portion 404' of transferred simulated hair style 402' based at least on tip position, $p_r^{o}$, of tip 21 of the $r^{th}$ simulated hair strand 12 of portion 404 and center of mass, $X_{cm}^{\ \ o}$. Rotational matrix, $R_r$, may be determined using any suitable method. In some embodiments, rotational matrix, $R_r$, is determined as follows.

Determining the rotational matrix, $R_r$, of the $r^{th}$ simulated hair strand 12 of portion 404 may start with Equation (8), as follows:

$$A=(\Sigma_r t_r s_r{}^T)(\Sigma_r s_r s_r{}^T)^{-1}=A_{ts}A_{ss} \qquad (8)$$

where $t_r$ is a vector from $q_r$ to $X_{cm}$ and $s_r$ is a vector from $q_r^{\ o}$ to $X_{cm}^{\ \ o}$. The rotational matrix, $R_r$, is the rotational part of $A_{ts}$ which may be found by polar decomposition of $A_{ts}=R_r S$ according to Equations (9) and (10).

$$S32 \sqrt{A_{ts}{}^T A_{ts}} \qquad (9)$$

$$R_r=A_{ts}S^{-1} \qquad (10)$$

At step 480, transferred tip position, $p_r$, of tip 21' of the $r^{th}$ simulated transferred hair strand 12' of transferred portion 404' of transferred simulated hair style 402' is determined according to Equation (11).

$$p_r=x_{cm}+R_r s_r \qquad (11)$$

After rotational matrix $R_r$ (step 470) and new tip position $p_r$ (step 480) are determined, method 400 continues to step 490. Step 490 comprises determining new positions of all vertices 13 of the $r^{th}$ transferred simulated hair strand 12' based at least in part on transferred root position, $q_r$, transferred tip position, $p_r$, and the constraints of simulated strand data 418 (e.g. shape-preserving constraints such as, for example, the positional constraints of each vertex of the $r^{th}$ simulated hair strand 12 and/or the rod constraints of each segment connecting the adjacent vertices of the $r^{th}$ simulated hair strand 12). One or more iterations of the constraint enforcement process (e.g. a similar constraint enforcement process to that performed in step 70) may be employed at step 490 until desired results are obtained. In some embodiments, two iterations of the constraint enforcement process are employed.

In some embodiments, the step 490 constraint enforcement process may weight each constraint. The weights may be based at least in part on the inverse mass of the vertices and segments. In some embodiments, root points are set to zero (e.g. infinite mass) so that they will keep their position on the scalp.

Steps 470 through 490 may be repeated for each simulated hair strand 12 of portion 404. Specifically, if r is less than the total number of simulated hair strands 12 in portion 404, not, then method 400 continues from step 490 to step 495 where counter r is increased by one and then steps 470 to 490 are repeated. Otherwise, if r is equal to the total number of simulated hair strands 12 in portion 404, $r_{tot}$, then method 400 is complete and may output transferred simulated hair strands 12'.

Method 400 may be repeated for each portion 404 of a given hair style 402 to provide a transferred hair style 402'. In some embodiments, multiple instances of method 400 may occur in parallel (e.g. simultaneously or substantially simultaneously) while in other embodiments, multiple instances of method 400 may occur in series.

It should be understood that simulated hair strands (e.g. simulated hair strands 12) and simulated hair styles (e.g. simulated hair style 402) described herein may be or have been created in part or in whole manually (e.g. by an artist) or may be created automatically without manual input without changing how the methods described herein are employed.

While a number of methods described herein employ a counter to determine whether or not to repeat one or more steps, it should be understood that a counter is not mandatory and determining whether such steps should be repeated may be done otherwise and/or one or more steps could alternatively occur in parallel without departing from the scope of the invention. For example, steps 470 to 490 need not be repeated in series for each simulated hair strand 12 of portion 404. Instead, steps 470 to 490 could occur in parallel (e.g. simultaneously) for a plurality of simulated hair strands 12 of portion 404.

Methods described herein may be implemented by (or integrated with) any computer-based graphical simulation software that represents simulated hairs by a plurality of interconnected vertices. Exemplary, non-limiting examples of such computer-based graphical simulation software include Autodesk Mayan®, Autodesk 3DS Max™, Houdini™ Blender™, etc.

Where a component is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

Unless the context clearly requires otherwise, throughout the description and any accompanying claims (where present), the words "comprise," "comprising," and the like are to be construed in an inclusive sense, that is, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, shall refer to this document as a whole and not to any particular portions. Where the context permits, words using the singular or plural number may also include the plural or singular number respectively. The word "or," in reference to a list of two or more items, covers all of the following interpretations of the word: any of the items in the list, all of the items in the list, and any combination of the items in the list.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method and/or to provide the functionality as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods and/or provide functionality as described herein by executing software instructions in a program memory accessible to the processors.

Software and other modules may reside on servers, workstations, personal computers, tablet computers, image data encoders, image data decoders, PDAs, media players, PIDs and other devices suitable for the purposes described herein. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, network PCs, mini-computers, mainframe computers, and the like.

While processes or blocks of some methods are presented herein in a given order, alternative examples may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. In addition, while elements are at times shown as being performed sequentially, they may instead be performed simultaneously or in different sequences. It is therefore intended that the following claims are interpreted to include all such variations as are within their intended scope.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

The invention has a number of non-limiting aspects. Non-limiting aspects of the invention provide:

1. A method for manipulating vertex positions of one or more simulated hair strands while preserving shape details of the one or more simulated hair strands, the method comprising:
   receiving a displacement vector and a region as input;
   identifying one or more first consecutive groups of vertices of a first simulated hair strand within the region;
   for each of the one or more first consecutive group of vertices within the region:
      finding a representative (e.g. an average) vertex position;
      determining the closest vertex of the consecutive group of vertices to the representative vertex position;

determining a new positional constraint based on the closest vertex and the displacement vector;
   determining new vertex positions for the first simulated hair strand by executing a constraint enforcement process constrained by one or more constraints, the one or more constraints comprising the new positional constraint for each consecutive group of vertices and one or more shape-preserving constraints.

2. A method according to aspect 1 or any other aspect herein wherein receiving the displacement vector and the region comprises receiving manual user input (e.g. via a suitable user input device such as a mouse, motion capture device or touchscreen).

3. A method according to aspect 1 or any other aspect herein wherein receiving a displacement vector and a region comprises determining the displacement vector and the region based at least in part on a gesture of a user (e.g. via a suitable user input device such as a mouse, motion capture device or touchscreen).

4. A method according to aspect 1 or any other aspect herein wherein receiving a displacement vector and a region comprises determining the displacement vector and the region based at least in part on movement of a cursor by a user (e.g. via a suitable user input device such as a mouse, motion capture device, or touchscreen).

5. A method according to any one of aspects 1 to 4 or any other aspect herein wherein identifying the one or more first consecutive groups of vertices of the first simulated hair strand within the region comprises, for each of the one or more first consecutive groups:
   selecting a first vertex of the first simulated hair strand within the region and identifying the first vertex to be part of the first consecutive group; and
   identifying one or more additional vertices to be part of the first consecutive group if, for each of the one or more additional vertices:
      the additional vertex is directly connected by a single segment to a vertex previously identified to be part of the first consecutive group; and
      the additional vertex is within the region.

6. A method according to any one of aspects 1 to 5 or any other aspect herein wherein the one or more shape-preserving constraints comprise one or more positional constraints.

7. A method according to any one of aspects 1 to 6 or any other aspect herein wherein the one or more shape-preserving constraints comprise one or more rod constraints.

8. A method according to aspect 7 or any other aspect herein wherein the one or more rod constraints are selected from the group consisting of size constraints, stretch constraints, shear constraints, bending constraints, twisting constraints and orientation constraints.

9. A method according to any one of aspects 1 to 8 or any other aspect herein, the method comprising:
   identifying a clump associated with the first simulated hair strand;
   determining one or more clump constraints based at least in part on the clump associated with the first simulated hair strand; and
   wherein the one or more constraints comprise the one or more clump constraints.

10. A method according to aspect 9 or any other aspect herein wherein the clump comprises one or more nearby simulated hair strands of the one or more simulated hair strands and identifying the clump associated with the first simulated hair strand comprises identifying the one or more nearby simulated hair strands.

11. A method according to aspect 10 or any other aspect herein wherein identifying the one or more nearby simulated hair strands comprises identifying ones of the one or more simulated hair strands as nearby simulated hair strands if, for each one of the one or more simulated hair strands:

the one of the one or more simulated hair strands intersects a space centered around a tip of the first simulated hair strand; or the one of the one or more simulated hair strands intersects a space centered around a tip of a previously identified nearby simulated hair strand.

12. A method according to aspect 11 or any other aspect herein wherein the one or more clump constraints comprise a clump constraint corresponding to each of the one or more nearby simulated hair strands and each clump constraint comprises a relationship between the tip of the first simulated hair strand and a corresponding nearby simulated hair strand.

13. A method according to aspect 11 or any other aspect herein wherein the one or more clump constraints comprise a clump constraint corresponding to each of the one or more nearby simulated hair strands and each clump constraint comprises a distance between the tip of the first simulated hair strand and a nearest segment of a corresponding nearby simulated hair strand.

14. A method according to any one of aspects 1 to 13 or any other aspect herein wherein determining a new positional constraint based on the closest vertex and the displacement vector comprises adding the displacement vector to the closest vertex to obtain the new positional constraint.

15. A method for transferring at least a plurality of simulated hair strands from a first simulated character to a second simulated character, the method comprising:

determining a first center of mass of root positions of the plurality of simulated hair strands on the first character;

mapping the root positions of the plurality of simulated hair strands from the first character to the second character to obtain transferred root positions of a plurality of transferred simulated hair strands;

determining a second center of mass of the transferred root positions of the plurality of transferred simulated hair strands on the second character based on the transferred root positions; and for each of the plurality of simulated hair strands:

determining a rotational matrix based on the first center of mass, the second center of mass, the root positions and the transferred root positions;

determining a transferred tip position based on the center of mass, the transferred center of mass, the rotational matrix and a tip position; and determining new vertex positions by running a constraint enforcement process constrained by the transferred root position, the transferred tip position and one or more shape-preserving constraints.

16. A method according to aspect 15 or any other aspect herein wherein mapping root positions of the plurality of simulated hair strands from the first character to the second character to obtain the transferred root positions of the plurality of transferred simulated hair strands comprises mapping the root positions of the plurality of simulated hair strands from the first character in a first coordinate system to an intermediate coordinate system and subsequently mapping the plurality of simulated hair strands from the first character in the intermediate coordinate system to the second character in a second coordinate system to obtain the transferred root positions of the plurality of transferred simulated hair strands.

17. A method according to aspect 16 or any other aspect herein wherein the intermediate coordinate system is a two-dimensional coordinate system and the first and second coordinate systems are three-dimensional coordinate systems.

18. A method according to any one of aspects 15 to 17 or any other aspect herein wherein mapping the root positions of the plurality of simulated hair strands from the first character to the second character to obtain the transferred root position of the plurality of transferred simulated hair strands comprises mapping root positions of the plurality of simulated hair strands from a first triangular mesh of the first character to a second triangular mesh of the second character to obtain the transferred root position of the plurality of transferred simulated hair strands.

19. A method according to aspect 18 or any other aspect herein comprising determining a one-to-one correspondence of triangles of the first triangular mesh to triangles of the second triangular mesh and mapping root positions of the plurality of simulated hair strands from the first triangular mesh of the first character to the second triangular mesh of the second character to obtain the transferred root position of the plurality of transferred simulated hair strands based at least in part on the one-to-one correspondence.

20. A method according to any one of aspects 18 and 19 or any other aspect herein wherein mapping root positions of the plurality of simulated hair strands from the first triangular mesh of the first character to the second triangular mesh of the second character to obtain the transferred root position of the plurality of transferred simulated hair strands comprises mapping the root positions of the plurality of simulated hair strands in a barycentric coordinate system from the first triangular mesh of the first character to the second triangular mesh of the second character to obtain the transferred root positions of the plurality of transferred simulated hair strands in the barycentric coordinate system.

21. A method according to any one of aspects 15 to 17 or any other aspect herein wherein mapping the root positions of the plurality of simulated hair strands from the first character to the second character to obtain the transferred root position of the plurality of transferred simulated hair strands comprises mapping the root positions of the plurality of simulated hair strands from a first polygonal mesh of the first character to a second polygonal mesh of the second character to obtain the transferred root position of the plurality of transferred simulated hair strands.

22. A method according to aspect 21 or any other aspect herein comprising determining a one-to-one correspondence of polygons of the first polygonal mesh to polygons of the second polygonal mesh and mapping the root positions of the plurality of simulated hair strands from the first polygonal mesh of the first character to the second polygonal mesh of the second character to obtain the transferred root position of the plurality of transferred simulated hair strands based at least in part on the one-to-one correspondence.

23. A method according to any one of aspects 21 and 22 or any other aspect herein wherein mapping the root positions of the plurality of simulated hair strands from the first polygonal mesh of the first character to the second polygonal mesh of the second character to obtain the transferred root position of the plurality of transferred simulated hair strands comprises mapping the root positions of the plurality of simulated hair strands in a Wachspress coordinate system from the first polygonal mesh of the first character to the second polygonal mesh of the second character to obtain the transferred root positions of the plurality of transferred simulated hair strands in the Wachspress coordinate system.

24. A method according to anyone of aspects 15 to 23 or any other aspect herein wherein determining the first center of mass of the root positions of the plurality of simulated hair strands on the first character comprises determining an average position of the roots of the plurality of simulated hair strands on the first character.

25. A method according to any one of aspects 15 to 24 or any other aspect herein wherein determining the transferred tip position based on the center of mass, the transferred center of mass, the rotational matrix and a tip position comprises rotating a vector extending from the center of mass to the tip position based at least in part on the rotational matrix to obtain a rotated vector and adding the rotated vector to the transferred center of mass.

26. A method according to any one of aspects 15 to 25 or any other aspect herein wherein the one or more shape-preserving constraints comprise one or more positional constraints.

27. A method according to any one of aspects 15 to 26 or any other aspect herein wherein the one or more shape-preserving constraints comprise one or more rod constraints.

28. A method according to aspect 27 or any other aspect herein wherein the one or more rod constraints are selected from the group consisting of size constraints, stretch constraints, shear constraints, bending constraints, twisting constraints and orientation constraints.

29. Methods comprising any features, combinations of features and/or sub-combinations of features described herein or inferable therefrom.

30. Apparatus comprising any features, combinations of features and/or sub-combinations of features described herein or inferable therefrom 31. Kits comprising any features, combinations of features and/or sub-combinations of features described herein or inferable therefrom.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The invention claimed is:

1. A method for manipulating vertex positions of one or more simulated hair strands while preserving shape details of the one or more simulated hair strands, the method comprising:

receiving a displacement vector and a region as input;

identifying one or more first consecutive groups of vertices of a first simulated hair strand within the region;

for each of the one or more first consecutive group of vertices within the region:

finding a representative vertex position;

determining the closest vertex of the consecutive group of vertices to the representative vertex position;

determining a new positional constraint based on the closest vertex and the displacement vector; and determining new vertex positions for the first simulated hair strand by executing a constraint enforcement process constrained by one or more constraints, the one or more constraints comprising the new positional constraint for each consecutive group of vertices and one or more shape-preserving constraints.

2. The method according to claim 1 wherein receiving the displacement vector and the region comprises receiving manual user input.

3. The method according to claim 2 wherein the manual user input is received from one or more of a mouse, a motion capture device and a touchscreen.

4. The method according to claim 1 wherein receiving a displacement vector and a region comprises determining the displacement vector and the region based at least in part on a gesture of a user.

5. The method according to claim 4 wherein the gesture of a user is received from one or more of a mouse, a motion capture device and a touchscreen.

6. The method according to claim 1 wherein receiving a displacement vector and a region comprises determining the displacement vector and the region based at least in part on movement of a cursor by a user.

7. The method according to claim 6 wherein receiving a displacement vector and a region comprises determining the displacement vector and the region based at least in part on user input from one or more of a mouse, a motion capture device and a touchscreen.

8. The method according to claim 1 wherein identifying the one or more first consecutive groups of vertices of the first simulated hair strand within the region comprises, for each of the one or more first consecutive groups:

selecting a first vertex of the first simulated hair strand within the region and identifying the first vertex to be part of the first consecutive group; and identifying one or more additional vertices to be part of the first consecutive group if, for each of the one or more additional vertices:

the additional vertex is directly connected by a single segment to a vertex previously identified to be part of the first consecutive group; and the additional vertex is within the region.

9. The method according to claim 1 wherein the one or more shape-preserving constraints comprise one or more positional constraints.

10. The method according to claim 1 wherein the one or more shape-preserving constraints comprise one or more rod constraints.

11. The method according to claim 10 wherein the one or more rod constraints are selected from the group consisting of size constraints, stretch constraints, shear constraints, bending constraints, twisting constraints and orientation constraints.

12. The method according to claim 1, the method comprising:

identifying a clump associated with the first simulated hair strand;

determining one or more clump constraints based at least in part on the clump associated with the first simulated hair strand; and wherein the one or more constraints comprise the one or more clump constraints.

13. The method according to claim 12 wherein the clump comprises one or more nearby simulated hair strands of the one or more simulated hair strands and identifying the clump associated with the first simulated hair strand comprises identifying the one or more nearby simulated hair strands.

14. The method according to claim 13 wherein identifying the one or more nearby simulated hair strands comprises identifying ones of the one or more simulated hair strands as nearby simulated hair strands if, for each one of the one or more simulated hair strands:

the one of the one or more simulated hair strands intersects a space centered around a tip of the first simulated hair strand; or

26 the one of the one or more simulated hair strands intersects a space centered around a tip of a previously identified nearby simulated hair strand.

15. The method according to claim 14 wherein the one or more clump constraints comprise a clump constraint corresponding to each of the one or more nearby simulated hair strands and each clump constraint comprises a relationship between the tip of the first simulated hair strand and a corresponding nearby simulated hair strand.

16. The method according to claim 14 wherein the one or more clump constraints comprise a clump constraint corresponding to each of the one or more nearby simulated hair strands and each clump constraint comprises a distance between the tip of the first simulated hair strand and a nearest segment of a corresponding nearby simulated hair strand.

17. The method according to claim 1 wherein determining a new positional constraint based on the closest vertex and the displacement vector comprises adding the displacement vector to the closest vertex to obtain the new positional constraint.

18. The method according to claim 1 wherein finding a representative vertex position comprises finding an average vertex position.

* * * * *